(12) United States Patent
Karunamuni et al.

(10) Patent No.: US 10,481,769 B2
(45) Date of Patent: Nov. 19, 2019

(54) DEVICE, METHOD, AND GRAPHICAL USER INTERFACE FOR PROVIDING NAVIGATION AND SEARCH FUNCTIONALITIES

(71) Applicant: Apple Inc., Cupertino, CA (US)

(72) Inventors: Chanaka G. Karunamuni, San Jose, CA (US); Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/290,919

(22) Filed: May 29, 2014

(65) Prior Publication Data

US 2014/0365945 A1 Dec. 11, 2014

Related U.S. Application Data

(60) Provisional application No. 61/832,924, filed on Jun. 9, 2013.

(51) Int. Cl.
*G06F 3/0484* (2013.01)
*G06F 3/0485* (2013.01)
(Continued)

(52) U.S. Cl.
CPC ........ *G06F 3/0484* (2013.01); *G06F 3/04817* (2013.01); *G06F 3/04886* (2013.01)

(58) Field of Classification Search
CPC .... G06F 3/017; G06F 3/04842; G06F 3/0488; G06F 3/0482; G06F 3/0485;
(Continued)

(56) References Cited

U.S. PATENT DOCUMENTS

| 5,956,030 A * | 9/1999 | Conrad | G06F 3/0481 |
| | | | 715/769 |
| 6,400,996 B1 * | 6/2002 | Hoffberg | G05B 19/0426 |
| | | | 370/218 |

(Continued)

FOREIGN PATENT DOCUMENTS

| CN | 102063253 A | 5/2011 |
| JP | 2000-221879 A | 8/2000 |

(Continued)

OTHER PUBLICATIONS

Notice of Allowance, dated Oct. 30, 2015, received in Taiwanese Patent Application No. 103119173, which corresonds with U.S. Appl. No. 14/290,919, 3 pages.

(Continued)

*Primary Examiner* — Renee D Chavez
*Assistant Examiner* — Carl P Lobo
(74) *Attorney, Agent, or Firm* — Morgan, Lewis & Bockius LLP

(57) ABSTRACT

A device with touch-sensitive surface and display is configured to: display a page of a multi-page interface; and detect an input that includes a contact and movement of the contact on the touch-sensitive surface. The device is further configured to, in response to detecting the input: if the input meets next-page display criteria, where the next-page display criteria include a criterion that is met when the contact moves by more than a predefined amount in a first predetermined direction, replace display of the page with display of a second page of the multi-page interface; and if the input meets search-interface display criteria, where the search-interface display criteria include a criterion that is met when the contact moves by more than the predefined amount in a second predetermined direction that is perpendicular to the (Continued)

first direction, display a search interface that includes a search input field for inputting search terms.

30 Claims, 29 Drawing Sheets

(51) Int. Cl.
  *G06F 3/0488* (2013.01)
  *G06F 3/0481* (2013.01)
(58) Field of Classification Search
  CPC ......... G06F 17/30554; G06F 17/30696; G06F 17/30899; G06F 17/30038; G06F 17/3082; G06F 2221/0704; G06F 3/04817; G06F 9/4443; G06F 3/038; G06F 3/0416; G06F 3/04886; G06F 3/0428; G06F 3/03547; G06F 3/0481; G06F 2203/04808; G06F 3/04847; G06F 3/0484; G06F 3/0414; G06F 2203/04104; G06F 2209/545; G06F 2209/548; G06F 9/54; G06F 9/542; G06F 3/0354; G06F 16/44; G06F 16/248; H05L 51/046; G09G 2340/0471; H04L 67/10
  See application file for complete search history.

(56) References Cited

U.S. PATENT DOCUMENTS

| | | | | |
|---|---|---|---|---|
| 6,556,222 | B1* | 4/2003 | Narayanaswami .. | G04G 9/0064 368/295 |
| 7,870,496 | B1* | 1/2011 | Sherwani ................ | H04L 67/38 715/718 |
| 8,196,066 | B1 | 6/2012 | Ouyang et al. | |
| 8,205,157 | B2* | 6/2012 | Van Os ................ | G06F 3/0488 715/702 |
| 8,238,876 | B2* | 8/2012 | Teng ........................ | H04M 1/67 455/411 |
| 8,239,785 | B2* | 8/2012 | Hinckley ............ | G06F 3/04883 345/173 |
| 8,261,213 | B2* | 9/2012 | Hinckley ............ | G06F 3/03545 715/769 |
| 8,411,060 | B1* | 4/2013 | Scholler ............. | G06F 3/04883 345/173 |
| 8,799,827 | B2* | 8/2014 | Hinckley .............. | G06F 3/0483 715/863 |
| 9,170,676 | B2* | 10/2015 | Krulce ............... | G06F 3/0416 |
| 9,274,682 | B2* | 3/2016 | Hinckley ............. | G06F 3/0483 |
| 9,310,994 | B2* | 4/2016 | Hinckley ............. | G06F 3/0483 |
| 9,367,205 | B2* | 6/2016 | Hinckley ........... | G06F 3/04817 |
| 9,454,304 | B2* | 9/2016 | Hinckley ............. | G06F 3/0483 |
| 9,513,801 | B2* | 12/2016 | Chaudhri ............. | G06F 9/4443 |
| 9,582,122 | B2* | 2/2017 | Bathiche ............. | G06F 3/0488 |
| 9,652,132 | B2* | 5/2017 | Tabone ............... | G06F 3/04842 |
| 9,658,740 | B2* | 5/2017 | Chaudhri ........... | G06F 3/04817 |
| 9,740,923 | B2* | 8/2017 | Feng .................... | G06K 9/00389 |
| 2002/0113802 | A1* | 8/2002 | Card ................... | G06F 3/04815 345/619 |
| 2003/0048250 | A1* | 3/2003 | Boon ..................... | G06F 3/016 345/156 |
| 2008/0074391 | A1 | 3/2008 | Coe | |
| 2008/0098331 | A1 | 4/2008 | Novick et al. | |
| 2008/0165141 | A1* | 7/2008 | Christie ................. | G06F 3/044 345/173 |
| 2008/0165210 | A1* | 7/2008 | Platzer ................. | G06F 3/0485 345/672 |
| 2008/0195664 | A1* | 8/2008 | Maharajh .......... | G06F 17/30035 |
| 2008/0305815 | A1* | 12/2008 | McDonough ....... | H04L 12/5895 455/466 |
| 2008/0320391 | A1* | 12/2008 | Lemay ................ | G06F 3/04886 715/702 |
| 2009/0007017 | A1* | 1/2009 | Anzures ............. | G06F 3/04883 715/835 |
| 2009/0064055 | A1 | 3/2009 | Chaudhri et al. | |
| 2009/0183124 | A1 | 7/2009 | Sridhar et al. | |
| 2009/0228825 | A1 | 9/2009 | Van Os et al. | |
| 2010/0013780 | A1* | 1/2010 | Ikeda .................. | G06F 3/0883 345/173 |
| 2010/0069054 | A1* | 3/2010 | Labidi .................... | G01C 21/20 455/418 |
| 2010/0077058 | A1 | 3/2010 | Messer | |
| 2010/0205559 | A1 | 8/2010 | Rose | |
| 2010/0231533 | A1* | 9/2010 | Chaudhri ............ | G06F 3/04817 345/173 |
| 2010/0332981 | A1* | 12/2010 | Lipton ................. | G11B 27/034 715/716 |
| 2011/0145863 | A1 | 6/2011 | Alsina et al. | |
| 2011/0163967 | A1 | 7/2011 | Chaudhri | |
| 2011/0166777 | A1* | 7/2011 | Chavakula ......... | G01C 21/3667 701/533 |
| 2011/0167369 | A1* | 7/2011 | van Os ................. | G06F 3/0483 715/769 |
| 2011/0179380 | A1* | 7/2011 | Shaffer ............... | G06F 3/04883 715/781 |
| 2011/0179386 | A1* | 7/2011 | Shaffer ............... | G06F 3/04883 715/835 |
| 2011/0179387 | A1* | 7/2011 | Shaffer ............... | G06F 3/04883 715/835 |
| 2011/0252357 | A1* | 10/2011 | Chaudhri ............ | G06F 3/04883 715/780 |
| 2011/0265003 | A1 | 10/2011 | Schubert et al. | |
| 2011/0270923 | A1* | 11/2011 | Jones ..................... | G06F 3/0421 709/204 |
| 2011/0271207 | A1* | 11/2011 | Jones .................... | H04W 4/206 715/753 |
| 2011/0271209 | A1* | 11/2011 | Jones .................... | H04L 12/1827 715/753 |
| 2012/0030623 | A1* | 2/2012 | Hoellwarth ......... | G06F 3/04817 715/811 |
| 2012/0069131 | A1* | 3/2012 | Abelow ............... | G06Q 10/067 348/14.01 |
| 2012/0084692 | A1* | 4/2012 | Bae ..................... | G06F 3/04817 715/769 |
| 2012/0154303 | A1* | 6/2012 | Lazaridis ............. | G06F 1/3203 345/173 |
| 2012/0159380 | A1* | 6/2012 | Kocienda ........... | G06F 3/04883 715/783 |
| 2012/0204131 | A1* | 8/2012 | Hoang .................... | G06F 9/445 715/835 |
| 2012/0235938 | A1* | 9/2012 | Laubach ................ | G06F 3/0416 345/173 |
| 2012/0240041 | A1* | 9/2012 | Lim ..................... | G06F 3/04883 715/702 |
| 2012/0284297 | A1* | 11/2012 | Aguera-Arcas ........ | G06F 21/629 707/769 |
| 2012/0304102 | A1* | 11/2012 | LeVee ..................... | G06F 9/451 715/779 |
| 2012/0304133 | A1* | 11/2012 | Nan .................... | G06F 3/04886 715/863 |
| 2013/0007665 | A1* | 1/2013 | Chaudhri .............. | H04L 51/24 715/830 |
| 2013/0050119 | A1* | 2/2013 | Nemoto ................ | G06F 3/0488 345/173 |
| 2013/0067419 | A1* | 3/2013 | Eltoft .................. | G06F 3/04847 715/863 |
| 2013/0073932 | A1* | 3/2013 | Migos ................. | G06F 15/0291 715/201 |
| 2013/0086597 | A1 | 4/2013 | Cornwall et al. | |
| 2013/0116032 | A1* | 5/2013 | Lutnick ............... | G07F 17/3276 463/17 |
| 2013/0117742 | A1* | 5/2013 | Newell ................ | G06F 9/45545 718/1 |
| 2013/0120295 | A1 | 5/2013 | Kim et al. | |
| 2013/0141359 | A1* | 6/2013 | Long .................... | G06F 3/0482 345/173 |
| 2013/0159915 | A1* | 6/2013 | Kim ........................ | G06F 3/017 715/776 |
| 2013/0169549 | A1* | 7/2013 | Seymour ............. | G06F 3/0488 345/173 |

(56) References Cited

U.S. PATENT DOCUMENTS

| | | | |
|---|---|---|---|
| 2013/0234941 A1* | 9/2013 | Hu | G06F 3/017 345/158 |
| 2013/0332886 A1* | 12/2013 | Cranfill | G06F 3/0482 715/835 |
| 2014/0053116 A1* | 2/2014 | Smith | G06F 3/0488 715/863 |
| 2014/0068494 A1* | 3/2014 | Petersen | H04M 1/7253 715/778 |
| 2014/0108927 A1* | 4/2014 | Vaidya | G06F 1/1694 715/708 |
| 2014/0165006 A1* | 6/2014 | Chaudhri | G06F 3/04817 715/835 |
| 2014/0184471 A1* | 7/2014 | Martynov | G06F 3/1423 345/1.2 |
| 2014/0232671 A1* | 8/2014 | Chaudhri | G06F 3/04883 345/173 |
| 2014/0250391 A1* | 9/2014 | Jong | G06F 3/0483 715/763 |
| 2014/0282208 A1* | 9/2014 | Chaudhri | G06F 3/04883 715/779 |
| 2014/0310643 A1* | 10/2014 | Karmanenko | G06F 1/1626 715/784 |
| 2014/0359435 A1* | 12/2014 | Zheng | G06F 3/0488 715/702 |
| 2014/0361982 A1* | 12/2014 | Shaffer | G06F 3/017 345/156 |
| 2014/0365912 A1* | 12/2014 | Shaw | G06F 3/04817 715/748 |
| 2014/0365919 A1* | 12/2014 | Shaw | H04L 12/1822 715/753 |
| 2015/0100982 A1* | 4/2015 | Sirpal | H04N 21/4126 725/37 |
| 2016/0018913 A1* | 1/2016 | Zhang | G06F 3/0488 345/173 |
| 2016/0048989 A1* | 2/2016 | Gabbidon | G06F 16/44 715/716 |

FOREIGN PATENT DOCUMENTS

| | | |
|---|---|---|
| JP | 2012-242846 A | 12/2012 |
| JP | 2013-021548 A | 1/2013 |
| JP | 2013-058009 A | 3/2013 |
| JP | 2013-058196 A | 3/2013 |
| JP | 2013-073466 A | 4/2013 |
| JP | 2013-084237 A | 5/2013 |
| JP | 2013-084260 A | 5/2013 |
| JP | 2014-519109 A | 8/2014 |
| WO | WO 2011/126502 A1 | 10/2011 |
| WO | WO 2013/060178 A1 | 5/2013 |

OTHER PUBLICATIONS

Certificate of Grant, dated Jul. 29, 2015, received in received in Dutch Patent Application No. NL2012926, which corresponds with U.S. Appl. No. 14/290,919, 1 page.
Written Opinion of the International Searching Authority, dated Sep. 17, 2014, received in International Patent No. PCT/US2014/040408, which corresponds with U.S. Appl. No. 14/290,919, 9 pages.
International Preliminary Report, dated Dec. 15, 2015, received in International Patent Application No. PCT/2014/040408, which corresponds with U.S. Appl. No. 14/290,919, 10 pages.
Certificate of Patent, dated Jan. 11, 2016, received in Taiwanese Patent Application No. 103119173, which corresponds with U.S. Appl. No. 14/290,919, 1 page.
NTT Docomo, Inc., "HT-03A", User's Manual, NTT Docomo, Inc, Oct. 31, 2009, 29 pages.
System Friend Co., Ltd, "Windows Store Apps Programming Guide for Professional", Softbank Creative Corp., first edition, May 29, 2013, 34 pages.
Office Action, dated Feb. 28, 2017, received in Japanese Patent Application No. 2016-518362, which corresponds with U.S. Appl. No. 14/290,919, 6 pages.
Office Action, dated Sep. 12, 2016, received in Australian Patent Application No. 2014278597, which corresponds with U.S. Appl. No. 14/290,919, 3 pages.
"iPhone User Guide Contents", http://manuals.info.apple.com/MANUALS/1000/MA1539/en_US/iPhone_iOS4_User_Guide.pdf, Jan. 2, 2011, 274 pages.
Petrich, "Changelog", https://rpetri.ch/cydia/activator/changelong.html, Feb. 14, 2017, 27 pages.
Office Action, dated May 23, 2017, received in European Patent Application No. 14734637.8, which corresponds with U.S. Appl. No. 14/290,919, 7 pages.
Notice of Acceptance, dated Aug. 31, 2017, received in Australian Patent Application No. 2014278597, which corresponds with U.S. Appl. No. 14/290,919, 3 pages.
Certificate of Grant, dated Jan. 3, 2018, received in Australian Patent Application No. 2014278597, which corresponds with U.S. Appl. No. 14/290,919, 1 page.
Office Action, dated Feb. 2, 2018, received in Chinese Patent Application No. 201480032707.9, which corresponds with U.S. Appl. No. 14/290,919, 5 pages.
Office Action, dated Sep. 11, 2017, received in Japanese Patent Application No. 2016-518362, which corresponds with U.S. Appl. No. 14/290,919, 5 pages.
Office Action, dated Sep. 14, 2017, received in Korean Patent Application No. 2015-7036744, which corresponds with U.S. Appl. No. 14/290,919, 5 pages.
iMore, How to Use Activator on a Jailbroken iPhone, iPad, or iPod Touch, You Tube, http:www.youtube.com/watch?v=WwIFys9CuEA, 2 pages.
ISO 9241-14:1997, "Ergonomic Requirements for Office Work with Visual Display Terminals (VDTs)—Part 14: Menu Dialogues," Jan. 1, 1997, 64 pages.
Wikipedia, The Free Encyclopedia, "MirrorLink", http://en.wikipedia.org/wiki/MirrorLink, Sep. 13, 2014, 3 pages.
Office Action, dated Aug. 29, 2014, received in Australian Patent Application No. 2014100585, which corresponds with U.S. Appl. No. 14/291,688, 4 pages.
Office Action, dated Feb. 6, 2015, received in Australian Patent Application No. 2014100585, which corresponds with U.S. Appl. No. 14/291,688, 3 pages.
International Search Report, dated Oct. 20, 2014, received in International Dutch Patent Application No. 2012965, which corresponds with U.S. Appl. No. 14/291,688, 5 pages.
International Search Report, dated Aug. 18, 2014, received in International Patent Application No. PCT/US2014/040416, which corresponds with U.S. Appl. No. 14/291,688, 3 pages.
International Search Report, dated May 12, 2015, received in Dutch Patent Application No. 2012926, which corresponds with U.S. Appl. No. 14/290,919, 7 pages.
International Search Report, dated Sep. 17, 2014, received in International Patent Application No. PCT/US2014/040408, which corresponds with U.S. Appl. No. 14/290,919, 4 pages.
Office Action, dated Nov. 6, 2017, 2018, received in Australian Patent Application No. 2017258815, which corresponds with U.S. Appl. No. 14/290,919, 5 pages.
Office Action, dated Dec. 24, 2018, received in Chinese Patent Application No. 201480032707.9, which corresponds with U.S. Appl. No. 14/290,919, 4 pages.
Office Action, dated Jun. 5, 2018, received in European Patent Application No. 14734637.8, which corresponds with U.S. Appl. No. 14/290,919, 8 pages.
Office Action, dated Oct. 19, 2018, received in Japanese Patent Application No. 2018-001331, which corresponds with U.S. Appl. No. 14/290,919, 7 pages.
Office Acton, dated Mar. 6, 2018, received in Korean Patent Application No. 2015-7036744, which corresponds with U.S. Appl. No. 14/290,919, 3 pages.
Notice of Allowance, dated Jun. 18, 2018, received in Korean Patent Application No. 2015-7036744, which corresponds with U.S. Appl. No. 14/290,919, 4 pages.

(56) References Cited

OTHER PUBLICATIONS

Patent, dated Sep. 18, 2018, received in Korean Patent Application No. 2015-7036744, which corresponds with U.S. Appl. No. 14/290,919, 3 pages.
Notice of Allowance, dated Dec. 21, 2018, received in Korean Patent Application No. 2018-7027060, which corresponds with U.S. Appl. No. 14/290,919, 5 pages.
Patent, dated Mar. 21, 2019, received in Korean Patent Application No. 2018-7027060 (5908KR01), which corresponds with U.S. Appl. No. 14/290,919, 5 pages.
Office Action, dated Apr. 18, 2019, received in Korean Patent Application No. 2019-7008189 (5908KR02), which corresponds with U.S. Appl. No. 14/290,919, 7 pages.
Office Action, dated May 7, 2019, received in Australian Patent Application No. 2017258815 (5908AU02), which corresponds with U.S. Appl. No. 14/290,919, 3 pages.
Office Action, dated May 5, 2019, received in Chinese Patent Application No. 201480032707.9 (5908CN), which corresponds with U.S. Appl. No. 14/290,919, 2 pages.
Notice of allowance, dated Jul. 29, 2019, received in Korean Patent Application No. 2019-7008189 (5908KR02), which corresponds with U.S. Appl. No. 14/290,919, 4 pages.
Patent, dated Aug. 6, 2019, received in Korean Patent Application No. 2019-7008189 (5908KR02), which corresponds with U.S. Appl. No. 14/290,919, 4 pages.
Office Action, dated Sep. 20, 2019, received in Japanese Patent Application No. 2018-001331 (5908JP01), which corresponds with U.S. Appl. No. 14/290,919, 7 pages.
Notice of Acceptance, dated Sep. 18, 2019, received in Australian Patent Application No. 2017258815 (5908AU02), which corresponds with U.S. Appl. No. 14/290,919, 3 pages.

* cited by examiner

DEVICE, METHOD, AND GRAPHICAL USER INTERFACE FOR PROVIDING NAVIGATION AND SEARCH FUNCTIONALITIES

RELATED APPLICATIONS

This application claims priority to U.S. Provisional Patent Application No. 61/832,924, filed Jun. 9, 2013, which is incorporated by reference herein in its entirety.

TECHNICAL FIELD

This relates generally to electronic devices with touch-sensitive surfaces, including but not limited to electronic devices with touch-sensitive surfaces that provide navigation and search functionalities.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate and navigate user interfaces.

Users can use touch inputs to navigate user interfaces and perform searches. But methods for performing these operations are cumbersome and inefficient. In addition, these methods take longer than necessary, thereby wasting energy. This latter consideration is particularly important in battery-operated devices.

SUMMARY

Accordingly, there is a need for electronic devices with faster, more efficient methods and interfaces for providing navigation and search functionalities. The embodiments described herein provide better integration of these functionalities, for example by making a search input interface available on different pages of a multi-page application launch interface, while also enabling a user to easily navigate between different pages in the multi-page application launch interface. Such methods and interfaces optionally complement or replace conventional methods for providing navigation and search functionalities. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device that includes a display and a touch-sensitive surface. The method includes: displaying a first page of a multi-page application launch interface that includes multiple pages of application icons for launching applications, where the first page includes a first plurality of application icons; and detecting, on the touch-sensitive surface, a first input that includes detecting a first contact and detecting movement of the first contact on the touch-sensitive surface. The method further includes, in response to detecting the first input on the touch-sensitive surface: in accordance with a determination that the first input meets next-page display criteria, where the next-page display criteria include a criterion that is met when the first contact moves by more than a predefined amount in a first predetermined direction on the touch-sensitive surface, replacing display of the first page of the multi-page application launch interface with display of a second page of the multi-page application launch interface that includes a second plurality of application icons that are different from the first plurality of application icons; and in accordance with a determination that the first input meets search-interface display criteria, where the search-interface display criteria include a criterion that is met when the first contact moves by more than the predefined amount in a second predetermined direction that is perpendicular to the first direction, displaying a search interface that includes a search input field for inputting search terms.

In accordance with some embodiments, an electronic device includes a display unit configured to display a first page of a multi-page application launch interface that includes multiple pages of application icons for launching applications, where the first page includes a first plurality of application icons; a touch-sensitive surface unit configured to receive user gestures; and a processing unit coupled to the display unit and the touch-sensitive surface unit. The processing unit is configured to detect, on the touch-sensitive surface unit, a first input that includes detecting a first contact and detecting movement of the first contact on the touch-sensitive surface unit. The processing unit is further configured to, in response to detecting the first input on the touch-sensitive surface unit: in accordance with a determination that the first input meets next-page display criteria, where the next-page display criteria include a criterion that is met when the first contact moves by more than a predefined amount in a first predetermined direction on the touch-sensitive surface, replace display of the first page of the multi-page application launch interface with display of a second page of the multi-page application launch interface that includes a second plurality of application icons that are different from the first plurality of application icons; and in accordance with a determination that the first input meets search-interface display criteria, where the search-interface display criteria include a criterion that is met when the first contact moves by more than the predefined amount in a second predetermined direction that is perpendicular to the first direction, enable display of a search interface that includes a search input field for inputting search terms.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described herein. In accordance with some embodiments, a non-transitory computer readable storage medium has stored therein instructions which when executed by an electronic device with a display and a touch-sensitive surface, cause the device to perform the operations of any of the methods referred described herein. In accordance with some embodiments, a graphical user interface on an electronic device with a display, a touch-sensitive surface, memory, and one or more processors to execute one or more programs stored in the memory includes one or more of the elements displayed in any of the methods described above, which are updated in response to inputs, as described in any of the methods described herein. In accordance with some embodiments, an electronic device includes a display, a touch-sensitive surface, and means for performing the operations of any of the methods described herein. In accordance with some embodiments, an information processing apparatus, for use in an electronic device with a display and a touch-sensitive surface, includes means for performing the operations of any of the methods described herein.

Thus, electronic devices with displays are provided with faster, more efficient methods and interfaces for providing navigation and search functionalities, thereby increasing the effectiveness, efficiency, and user satisfaction with such devices. Such methods and interfaces may complement or replace conventional methods for providing navigation and search functionalities.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Many electronic devices allow users to navigate user interfaces and perform navigation and search functionalities. The electronic devices described below improve on these methods by providing faster, more efficient, and better integrated methods and interfaces for users to navigate a multi-page application launch interface and search for content. For example, the devices make a search input interface directly accessible from a plurality of different pages of a multi-page application launch interface, while also enabling a user to easily navigate between different pages in the multi-page application launch interface. The devices also enable a user to use simple touch inputs to directly navigate to additional functionalities from the multi-page application launch interface, such as a notifications interface, a multi-tasking interface, and/or a settings interface.

Figure 7:
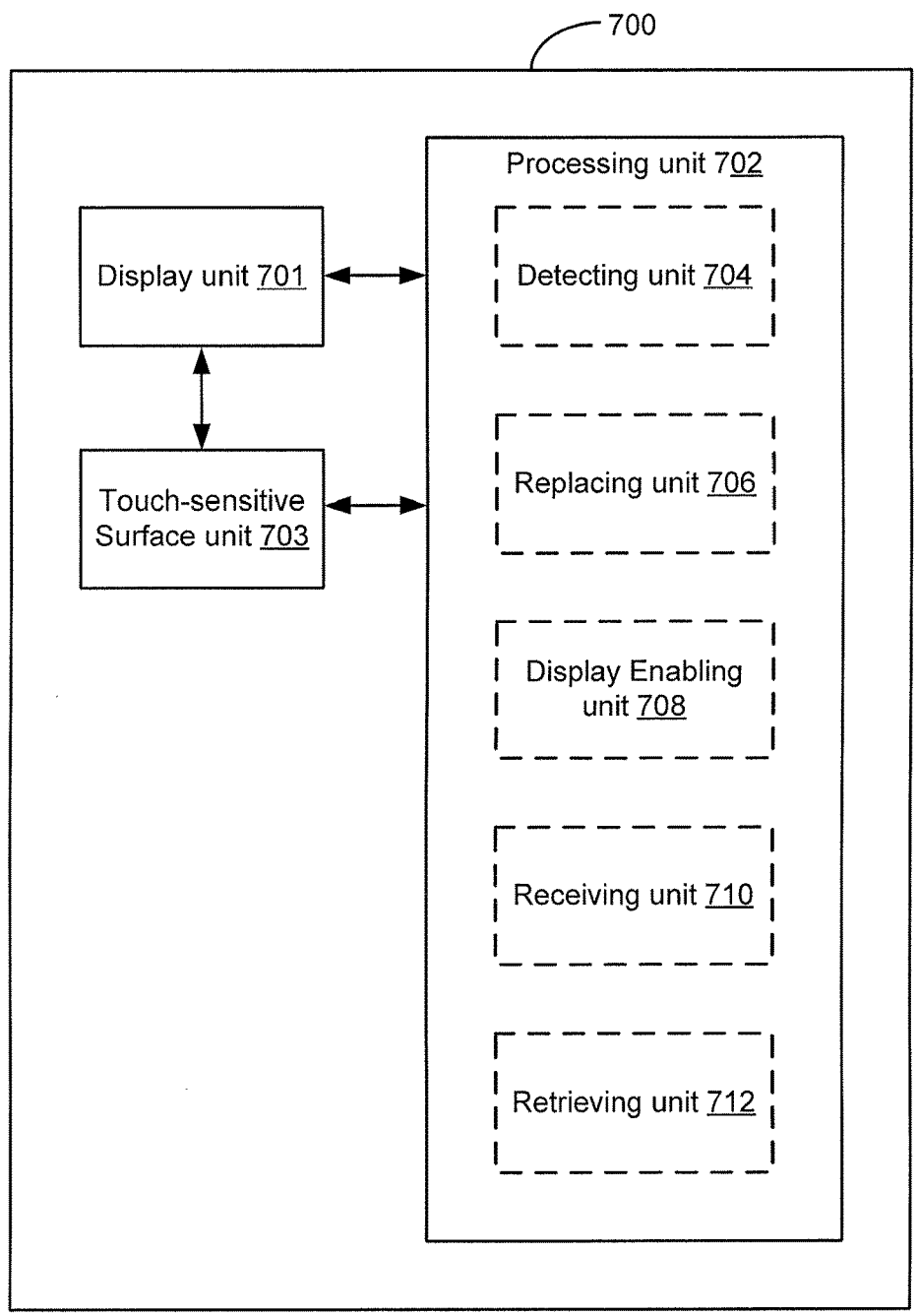
FIG. 7 is a functional block diagram of an electronic device in accordance with some embodiments.

Below, FIGS. 1A-1B, 2, and 3 provide a description of exemplary devices. FIGS. 4A-4B and 5A-5R illustrate exemplary user interfaces. FIGS. 6A-6D are flow diagrams illustrating a method of providing access to different functionalities including navigation and search functionalities. FIG. 7 is a functional block diagram of an electronic device. The user interfaces in FIGS. 5A-5R are used to illustrate the processes in FIGS. 6A-6D.

EXEMPLARY DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone@, iPod Touch@, and iPad@ devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch- sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
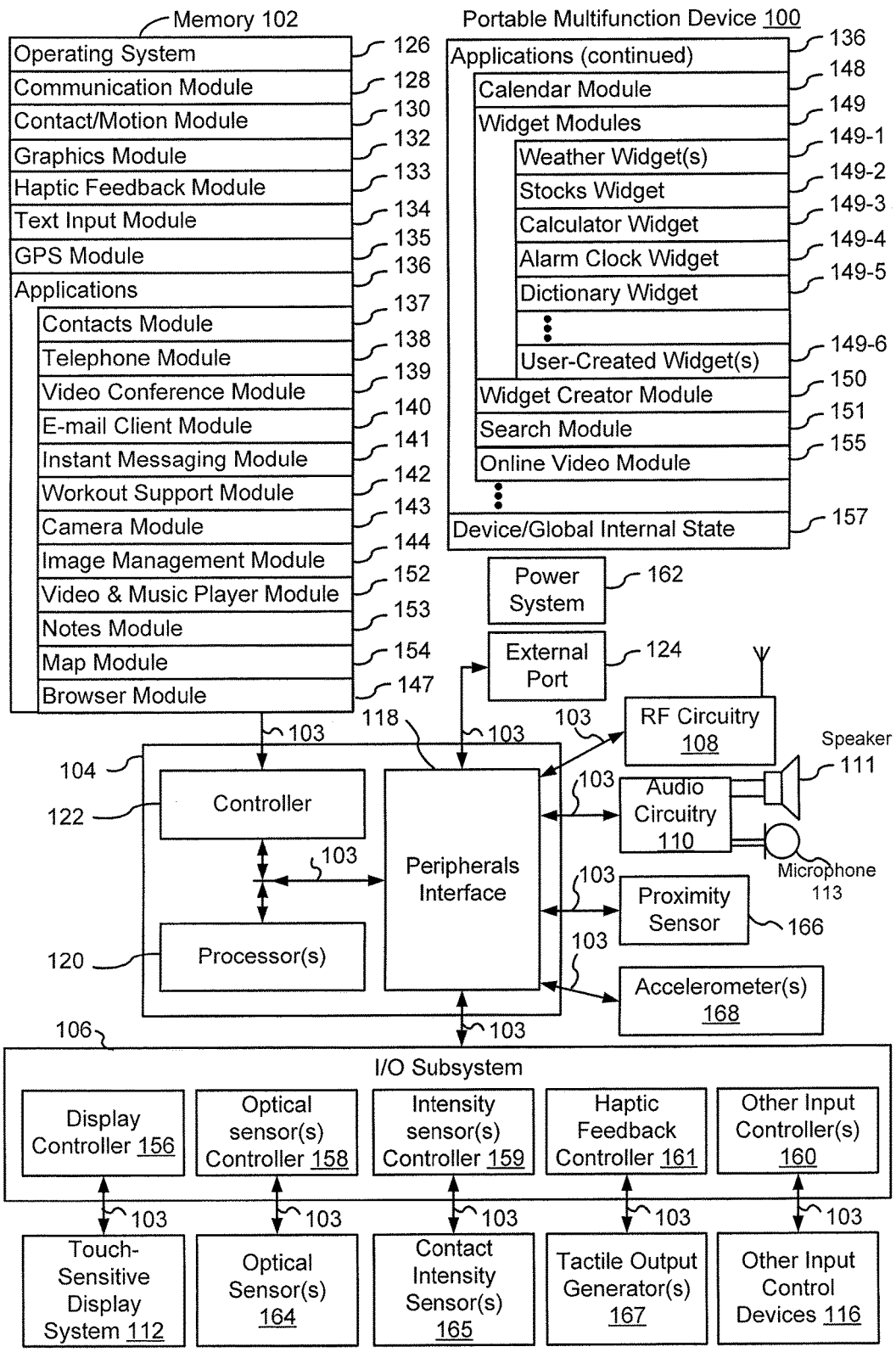
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof(collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch- sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
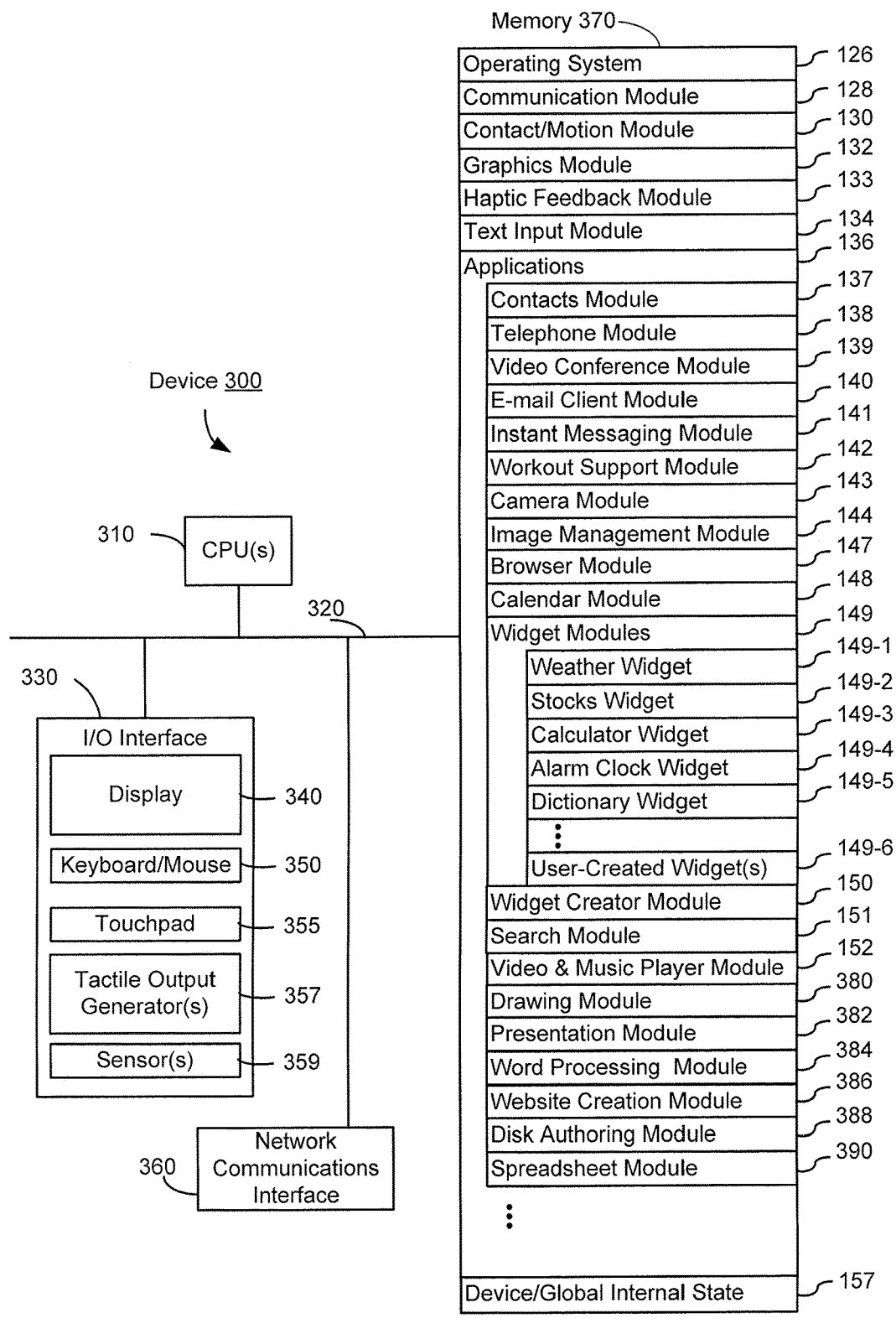
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices. In some embodiments, the external port is a multi-pin (e.g., 8-pin) connector that is the same as, or similar to and/or compatible with the 8-pin connector (e.g., Lightning connector) used on iPhone and iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (e.g., using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!@ Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
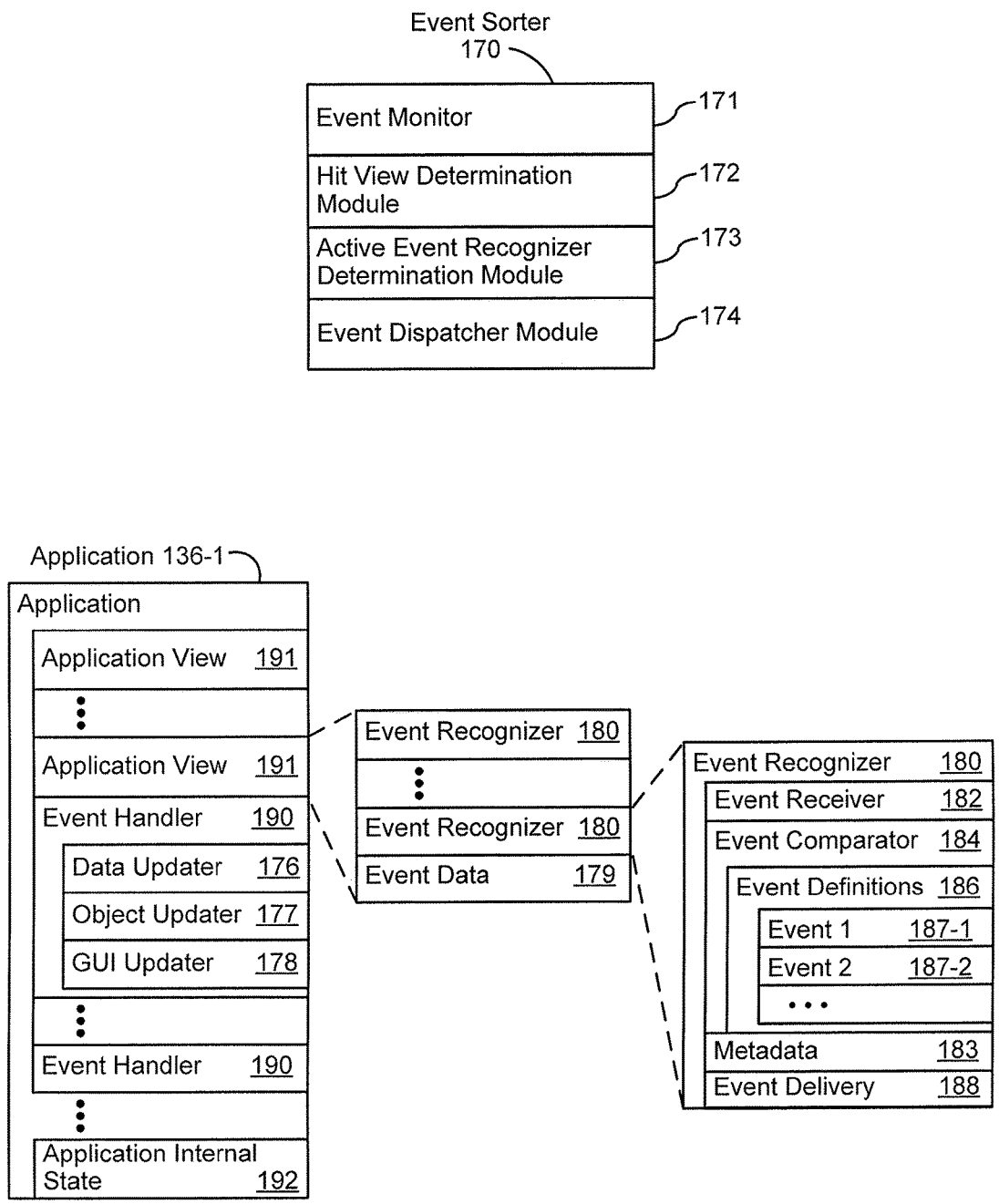
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
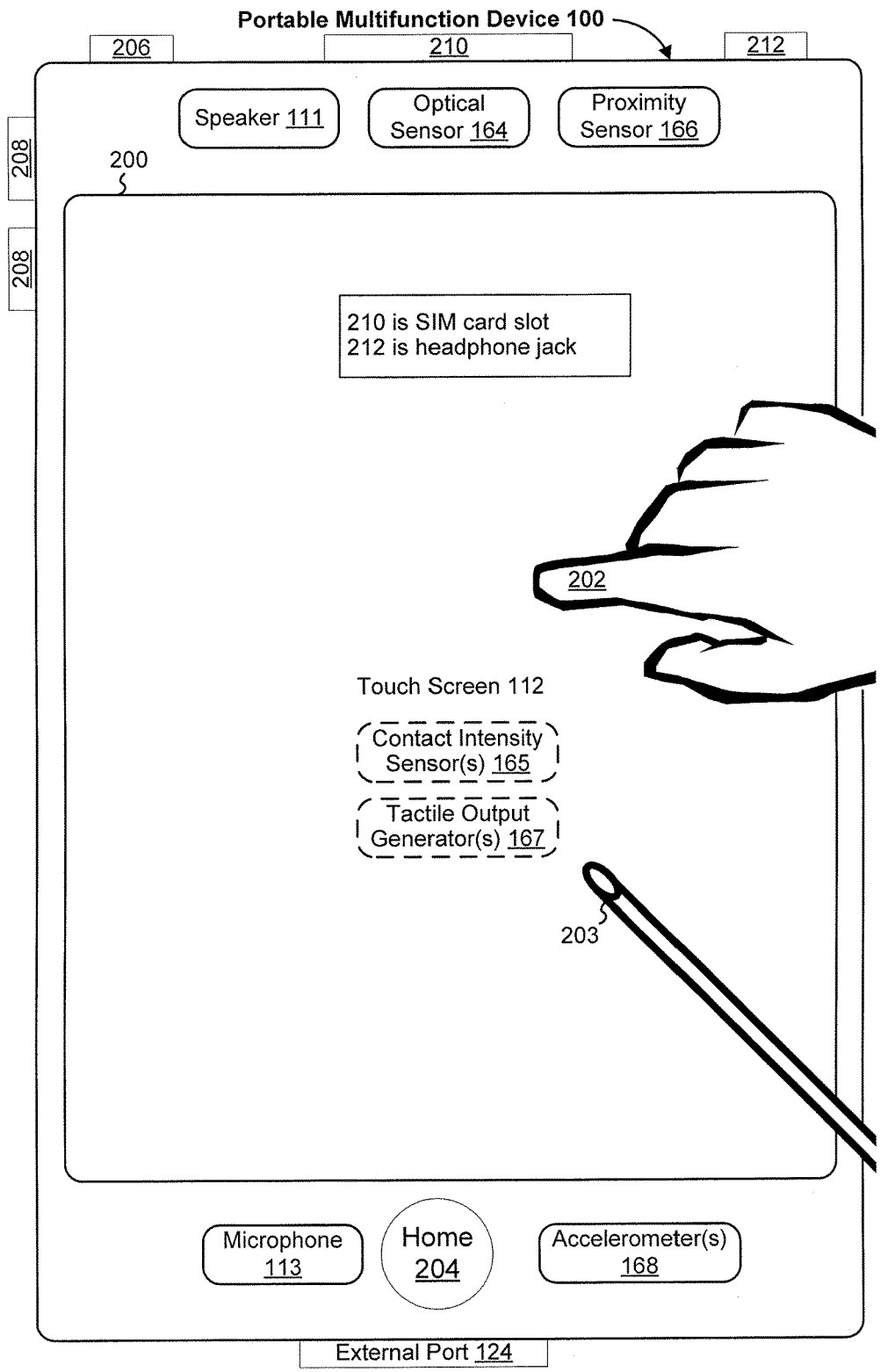
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display (e.g., touch screen display 112). I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
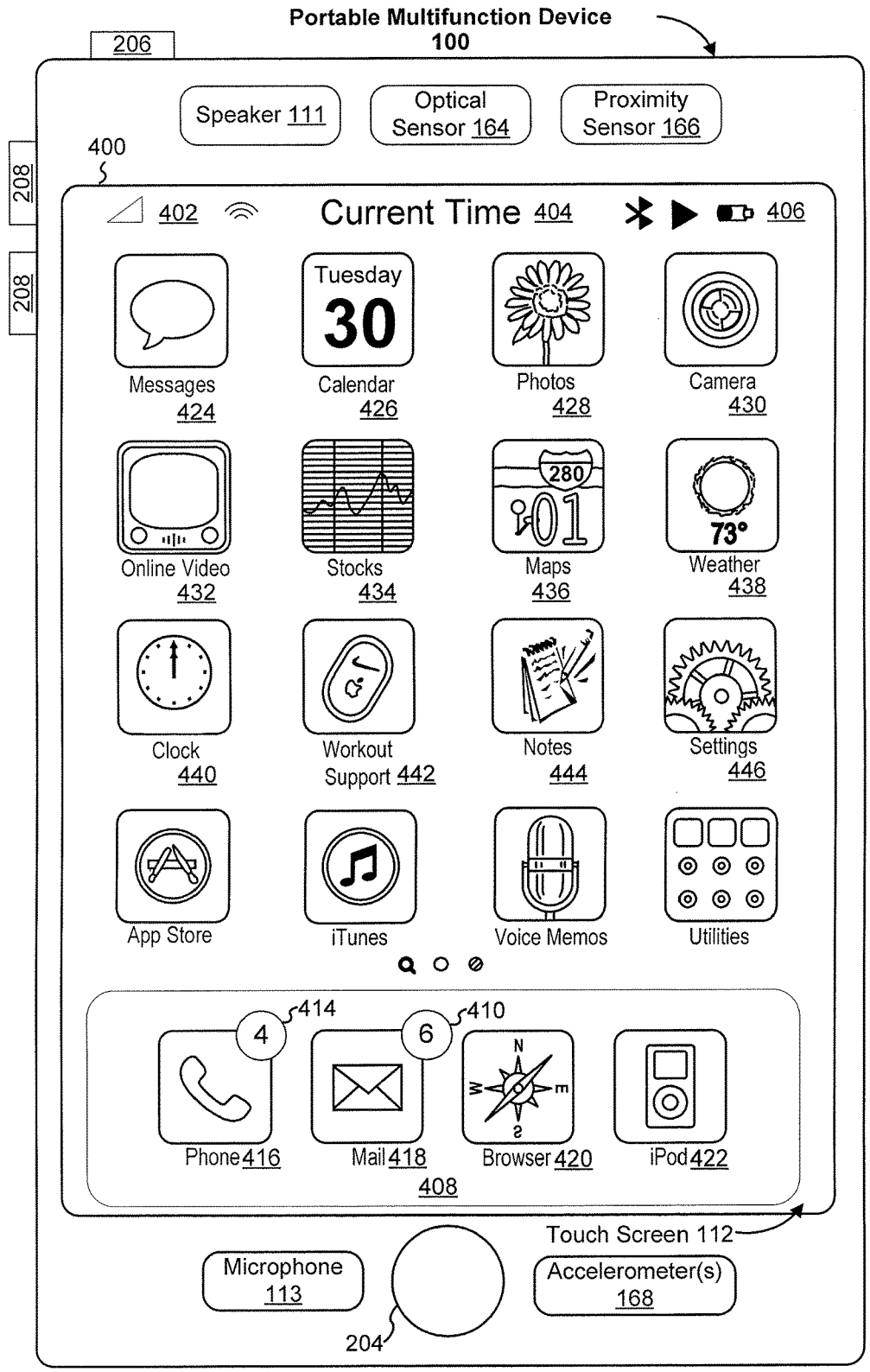
FIG. 4A illustrates an exemplary user interface for a menu of applications on a portable multifunction device in accordance with some embodiments.
Figure 5A:
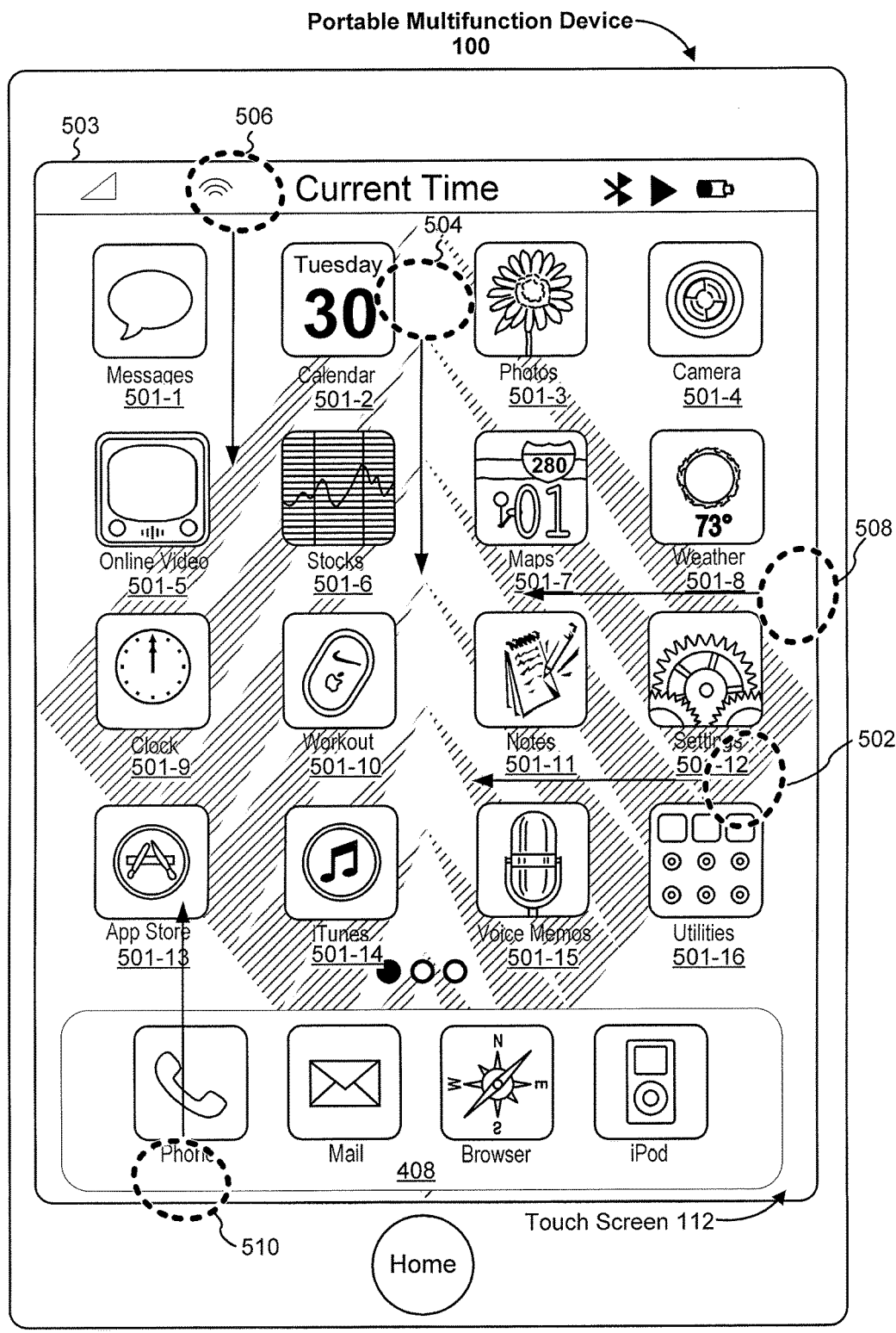
FIGS. 5A-5R illustrate exemplary user interfaces for providing access to different functionalities including navigation and search functionalities in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser"; and
Icon 422 for video and music player module 152, also referred to as iPod (trademark of Apple Inc.) module 152, labeled "iPod."
Icons for other applications, such as:
Icon 424 for IM module 141, labeled "Text";
Icon 426 for calendar module 148, labeled "Calendar";
Icon 428 for image management module 144, labeled "Photos";
Icon 430 for camera module 143, labeled "Camera";
Icon 432 for online video module 155, labeled "Online Video";
Icon 434 for stocks widget 149-2, labeled "Stocks";
Icon 436 for map module 154, labeled "Map";
Icon 438 for weather widget 149-1, labeled "Weather";
Icon 440 for alarm clock widget 149-4, labeled "Clock";
Icon 442 for workout support module 142, labeled "Workout Support";
Icon 444 for notes module 153, labeled "Notes"; and
Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
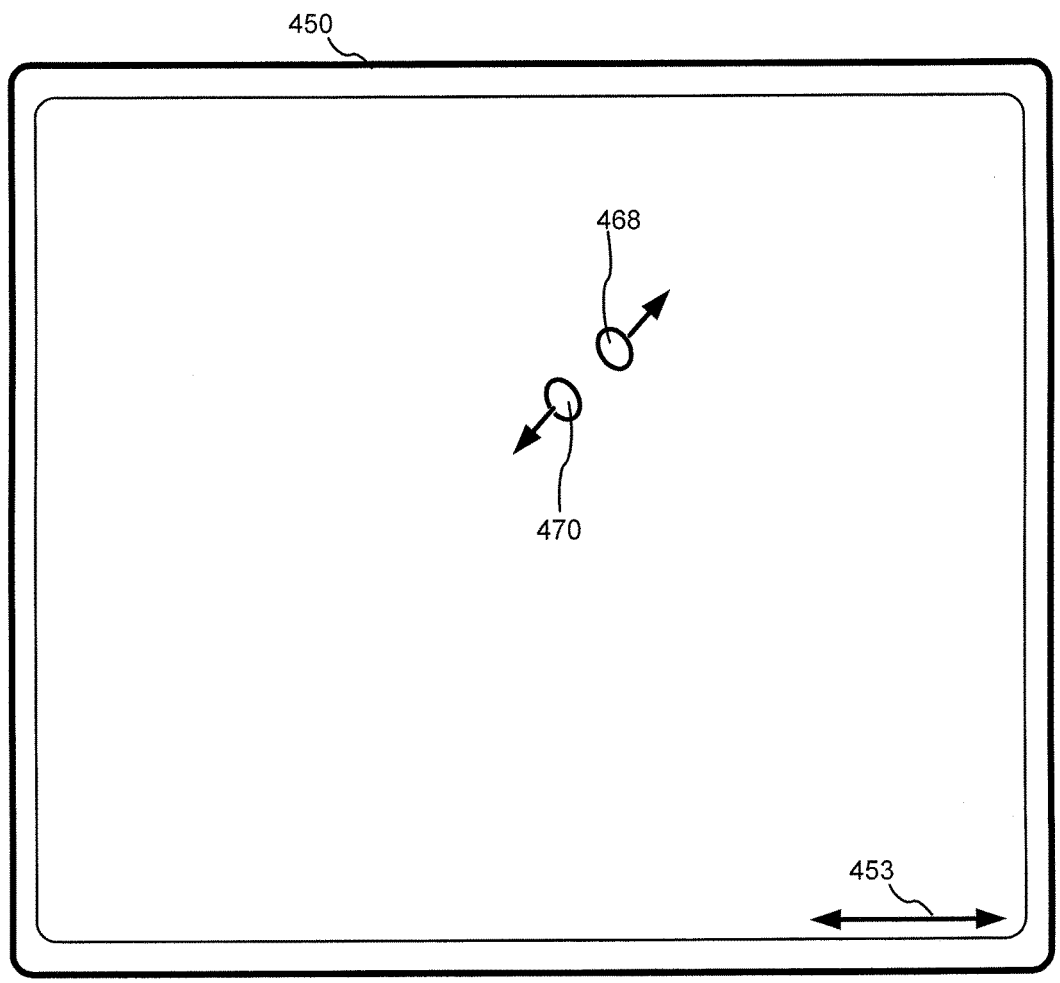
FIG. 4B illustrates an exemplary user interface for a multifunction device with a touch-sensitive surface that is separate from the display in accordance with some embodiments.
Figure 4B:
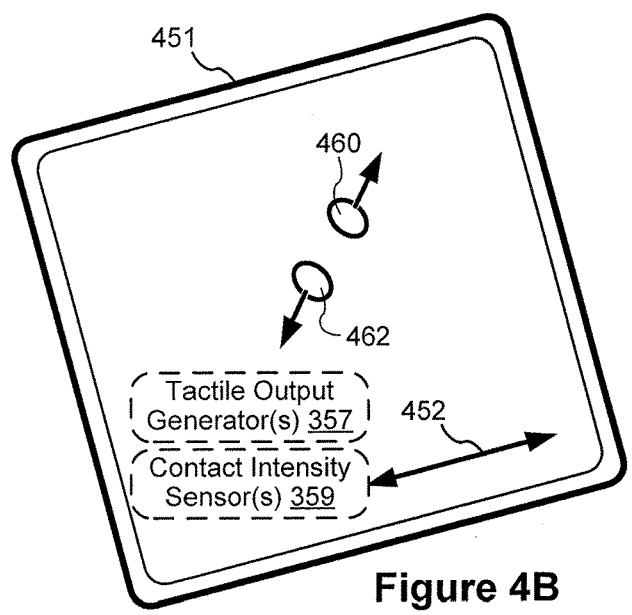

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

USER INTERFACES AND ASSOCIATED PROCESSES

Attention is now directed towards embodiments of user interfaces ("UI") and associated processes that may be implemented on an electronic device with a display and a touch-sensitive surface, such as device 300 or portable multifunction device 100.

FIGS. 5A-5R illustrate exemplary user interfaces for providing access to different functionalities including navigation and search functionalities in accordance with some embodiments. The user interfaces in these figures are used to illustrate the processes described below, including the processes in FIGS. 6A-6D.

FIG. 5A illustrates user interface 503 displayed on touch screen 112 of portable multifunction device 100 (sometimes herein also called "device 100"). User interface 503 includes a plurality of user interface objects (sometimes herein called "affordances" or "selectable user interface objects") including application icons 501 and tray 408 which, optionally, includes one or more selectable user interface objects. FIG. 5A further illustrates: input 502 including a contact and movement of the contact to the right that starts away from an edge of touch screen 112, in response to which the device, navigates from a first page of a multi-page application launch interface to a second page (e.g., as shown in FIGS. 5B-5D); input 504 including a contact and movement of the contact downward, in response to which the device displays a search interface that includes a search input field (e.g., as shown in FIGS. 5E-5G); input 506 including contact at the top edge of touch screen 112 and movement downward, in response to which the device, optionally, displays a notification center interface (e.g., as shown in FIG. 5J-5L); input 508 including contact at the right edge of touch screen 112 and movement to the left, in response to which the device, optionally displays a multitasking interface (e.g., as shown in FIGS. 5M-5O); and input 510 including contact at the bottom of touch screen 112 and movement upward, in response to which the device, optionally displays a settings interface (e.g., as shown in FIGS. 5P-5R).

Figure 5B:
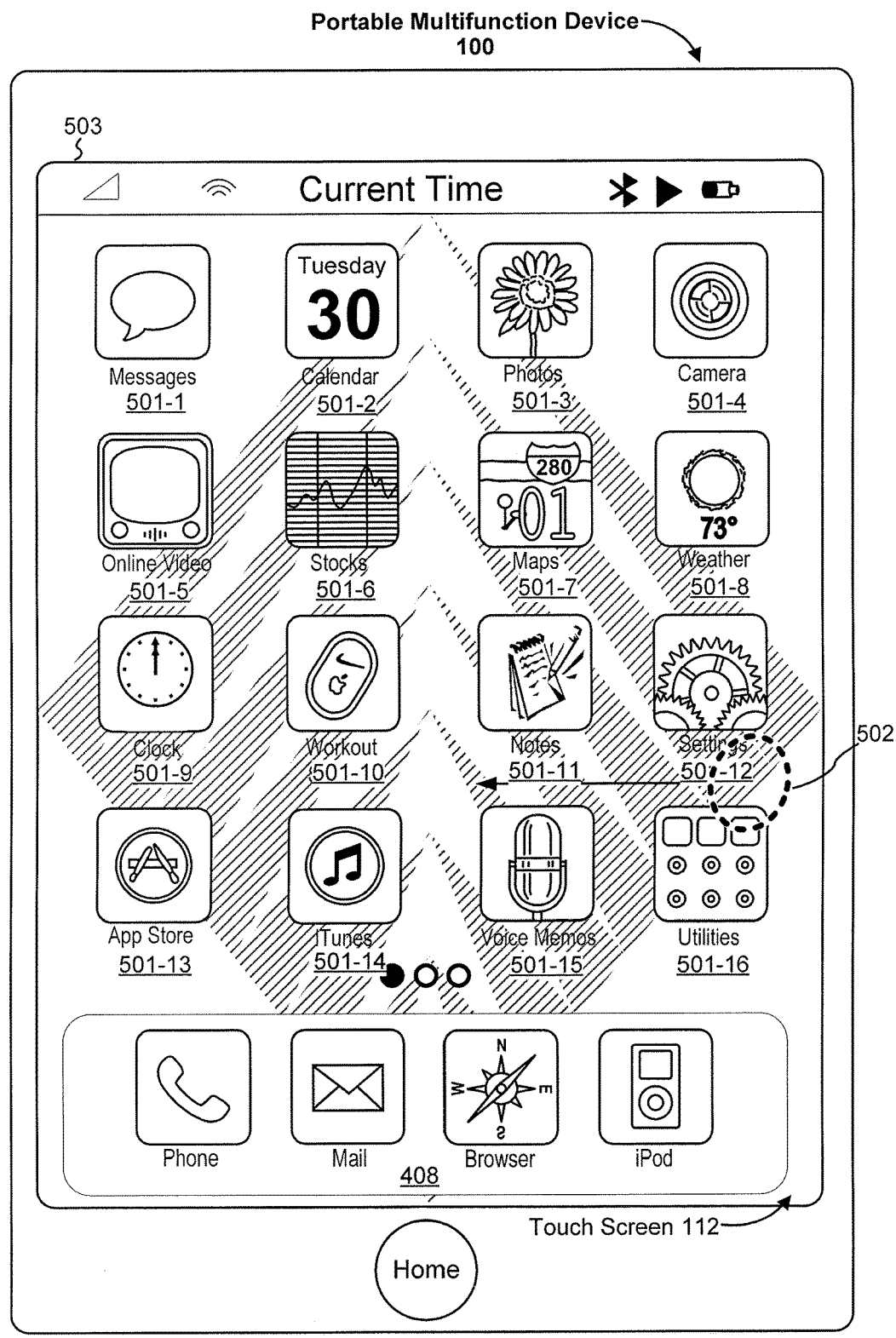
Figure 5C:
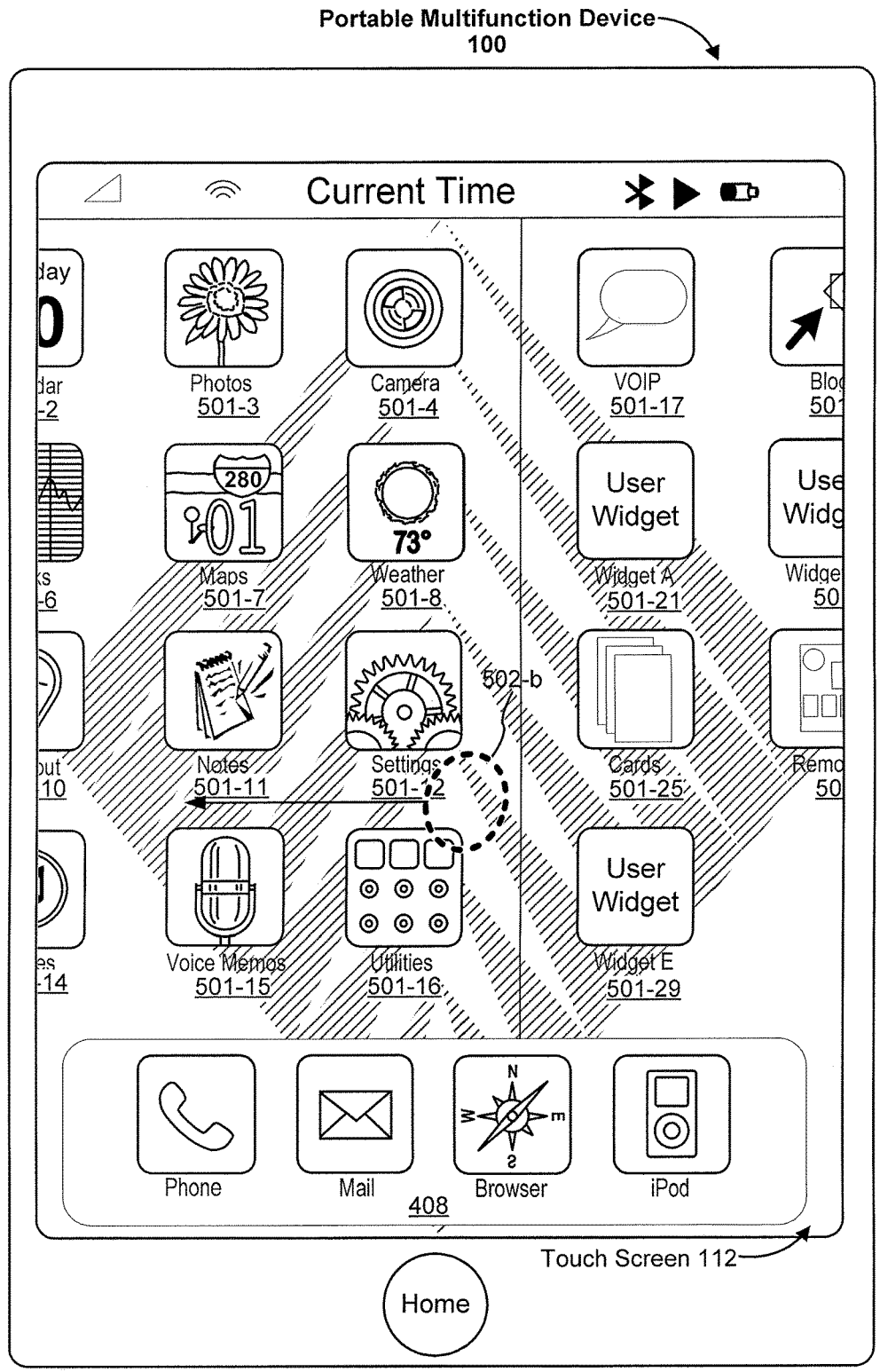
Figure 5D:
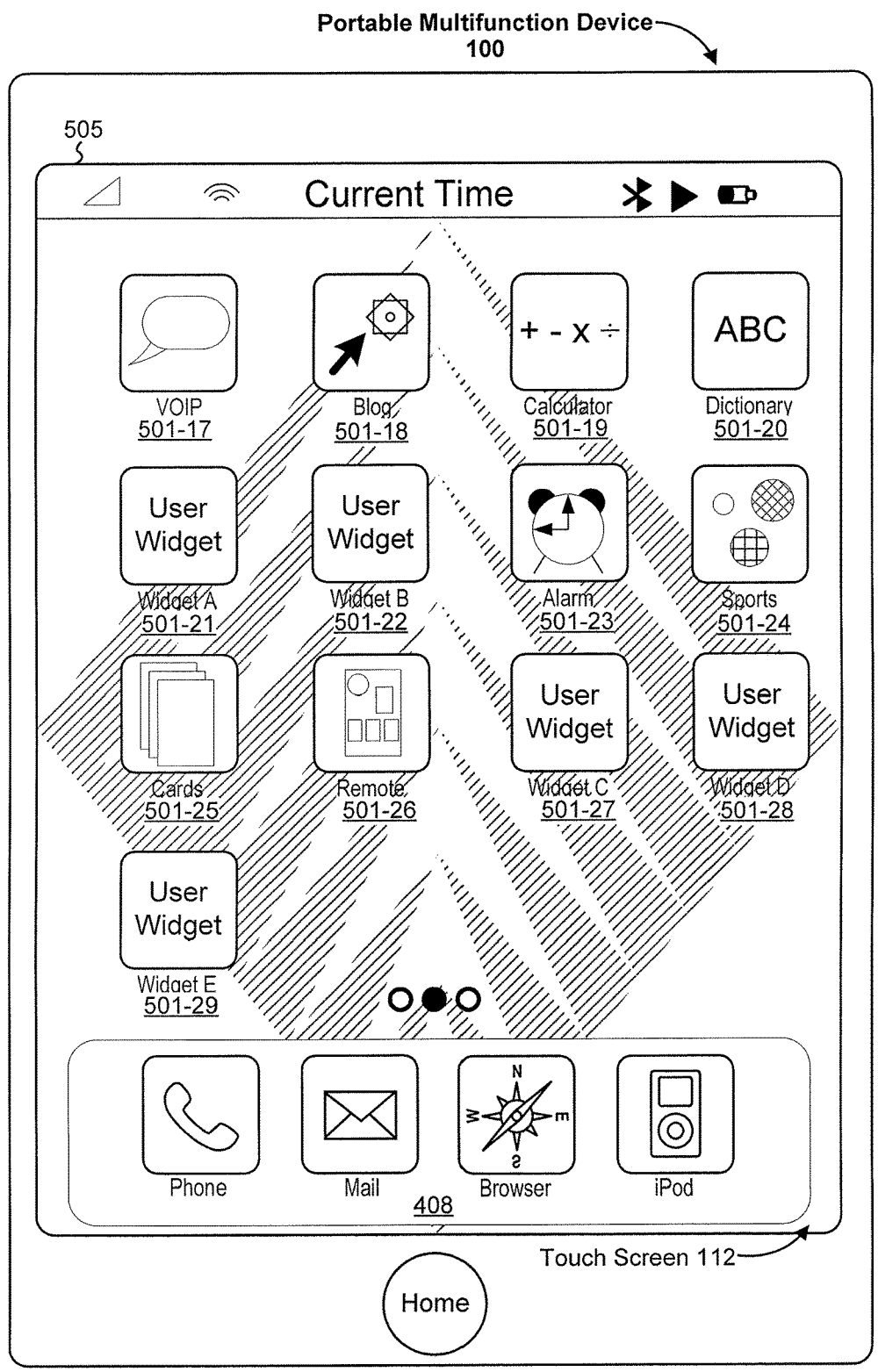

FIGS. 5B-5D illustrate an example of navigating from a first page of a multi-page application launch interface to a second page. FIG. 5B shows user interface 503 (e.g., page 1) and detection of input 502. Input 502 includes a contact and movement of the contact to the right. FIG. 5C illustrates input 502 at position 502-b and the corresponding transition between user interface 503 (e.g., page 1) and user interface 505 (e.g., page 2). FIG. 5D shows user interface 505 (e.g., page 2) with a different plurality of application icons 501 (e.g., application icons 501-17 through 501-29) (e.g., the device switches to a next page of a multi-page application launch interface in response to detecting a horizontal swipe gesture that starts at a location that is away from an edge of touch screen 112).

Figure 5E:
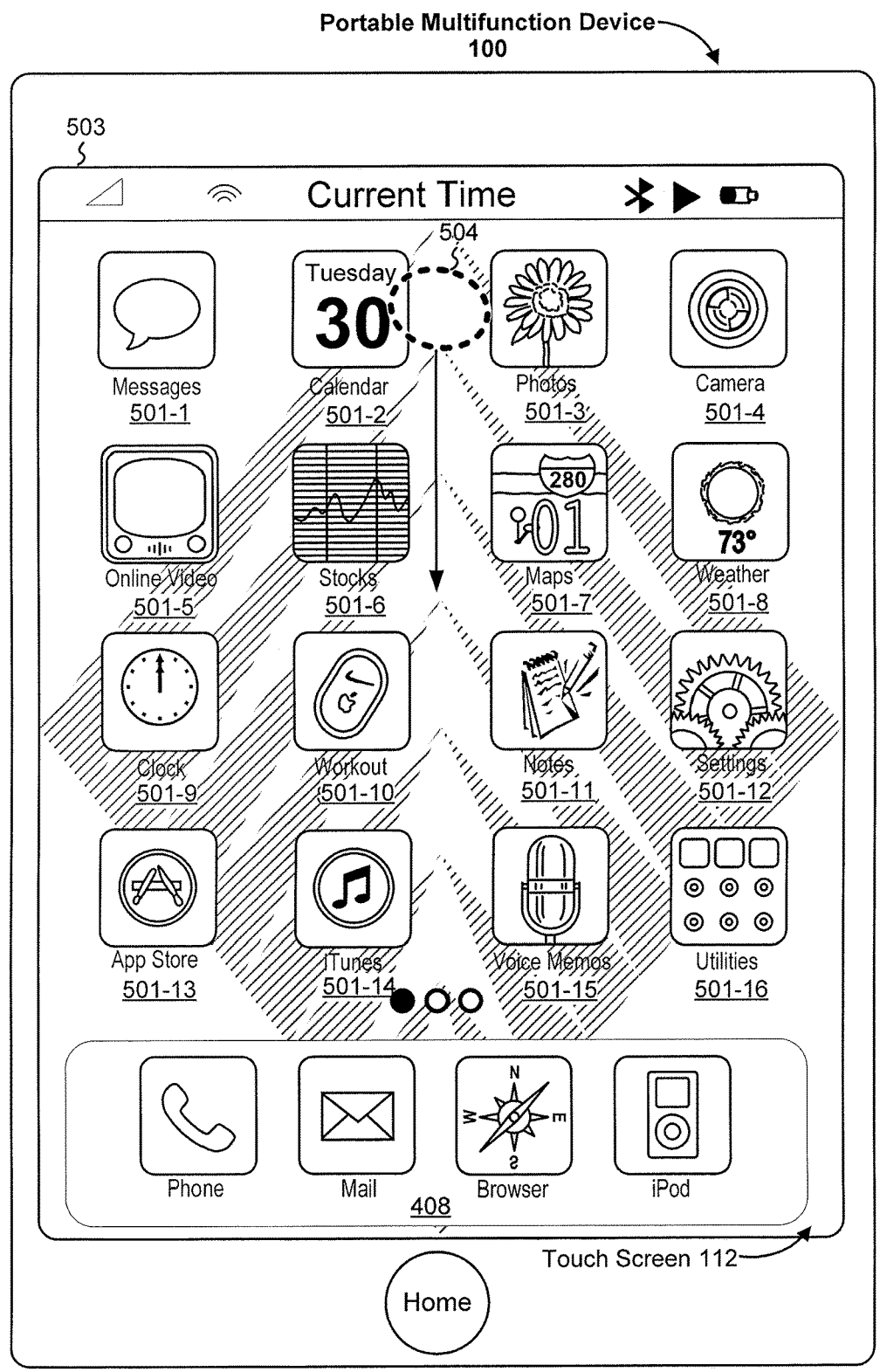
Figure 5F:
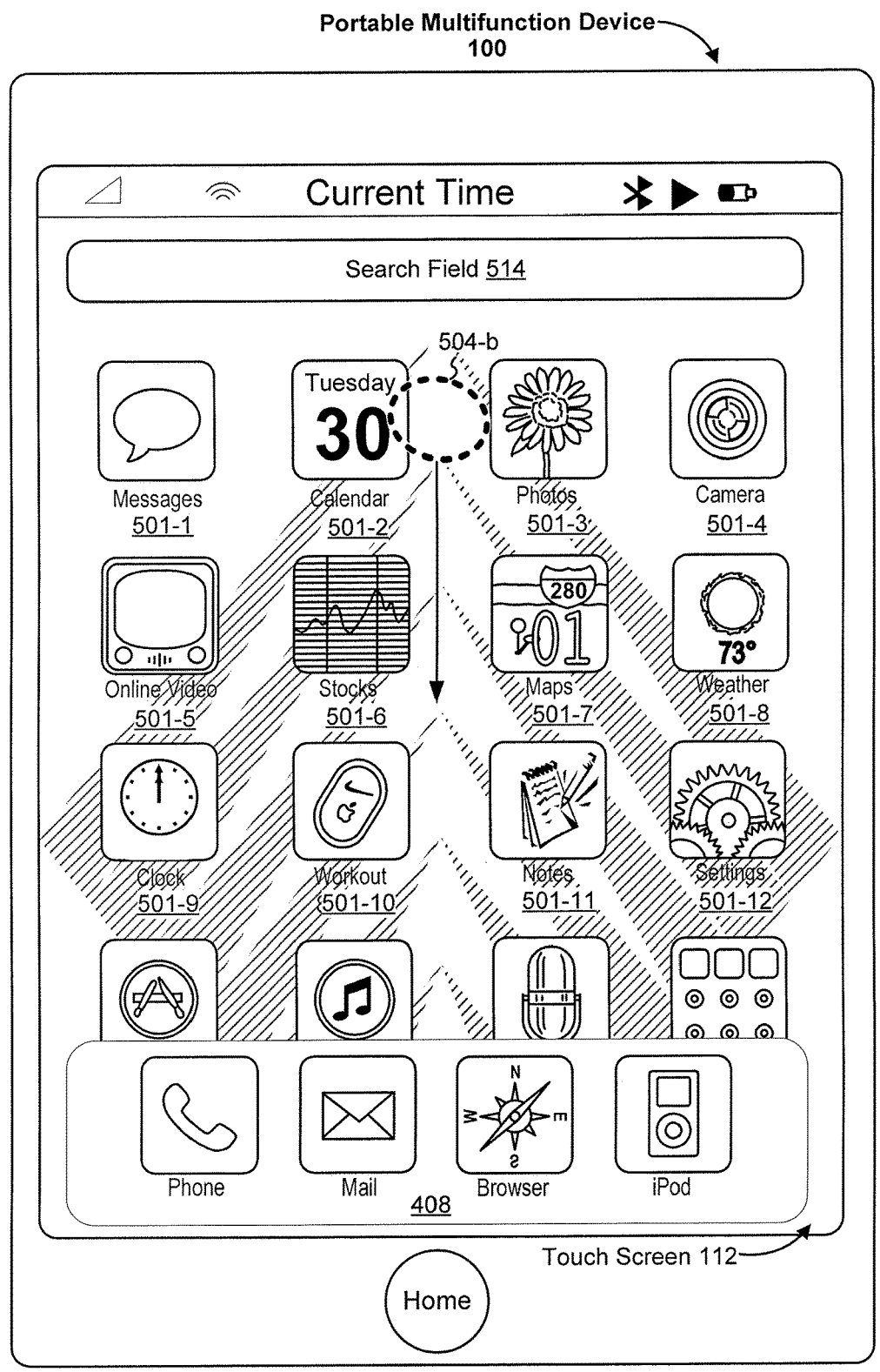
Figure 5G:
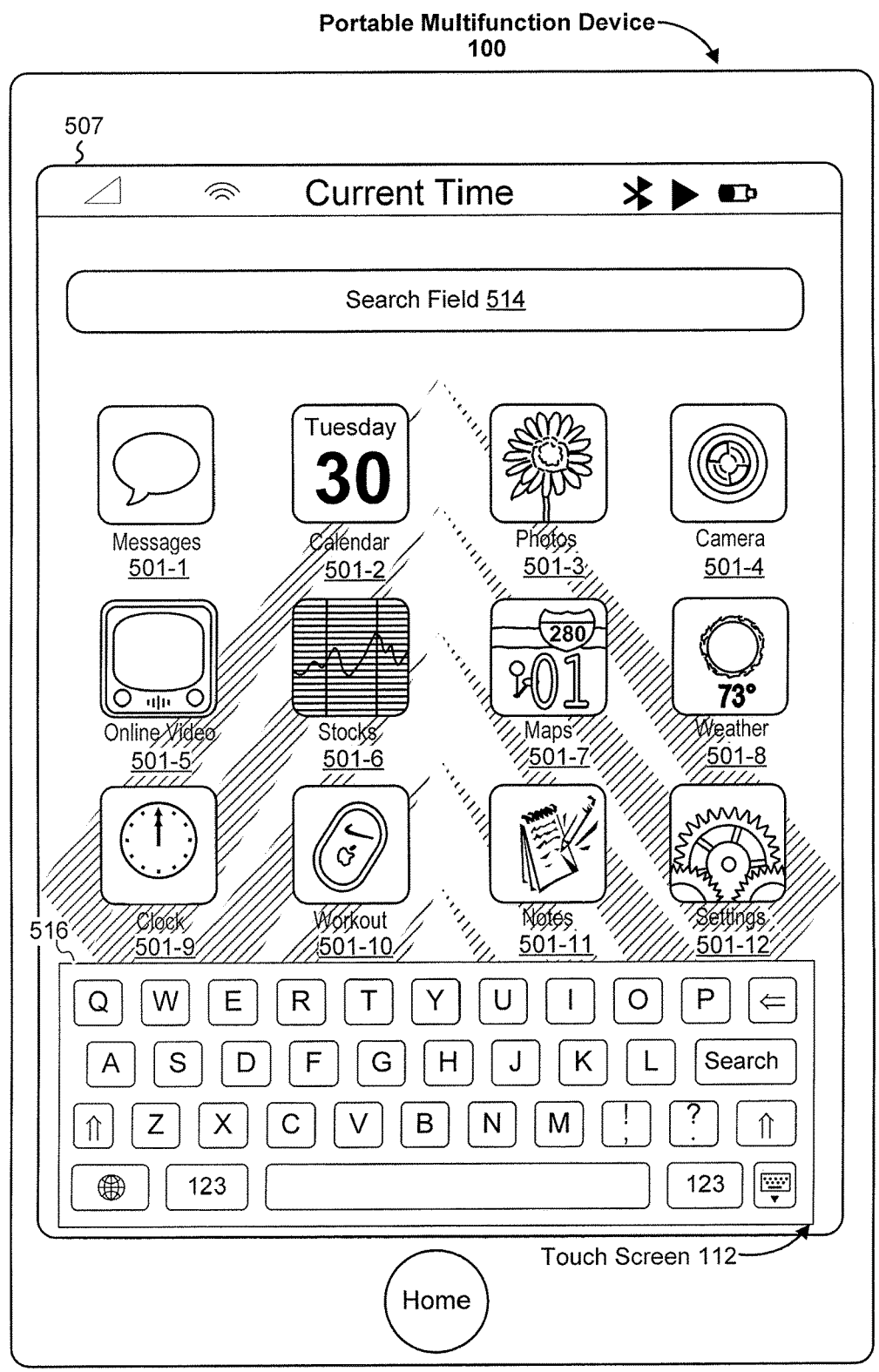

FIGS. 5E-5G illustrate an example of displaying a search interface that includes a search input field. FIG. 5E shows user interface 503 and detection of input 504. Input 504 includes a contact and movement downward. FIG. 5F illustrates input 504 at position 504-b and the corresponding transition between user interface 503 and search interface 507, including search field 514. FIG. 5G shows search interface 507 including search field 514 and keyboard 516 (e.g., the device displays a search interface in response to detecting a downward swipe gesture that starts at a location that is away from a top edge of touch screen 112 and was detected while a first page of the multi-page application launch interface was displayed on the display).

Figure 5H:
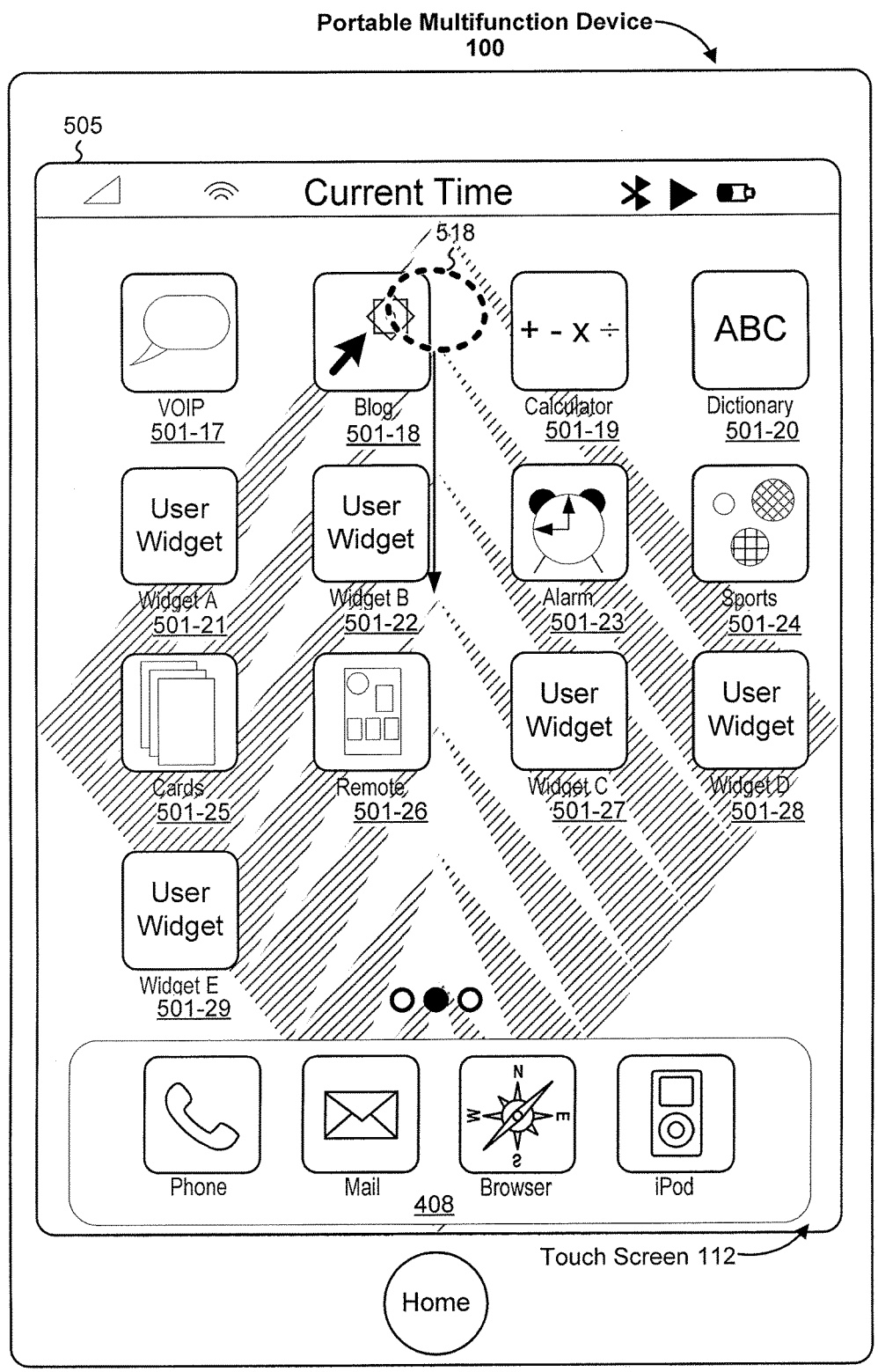
Figure 5I:
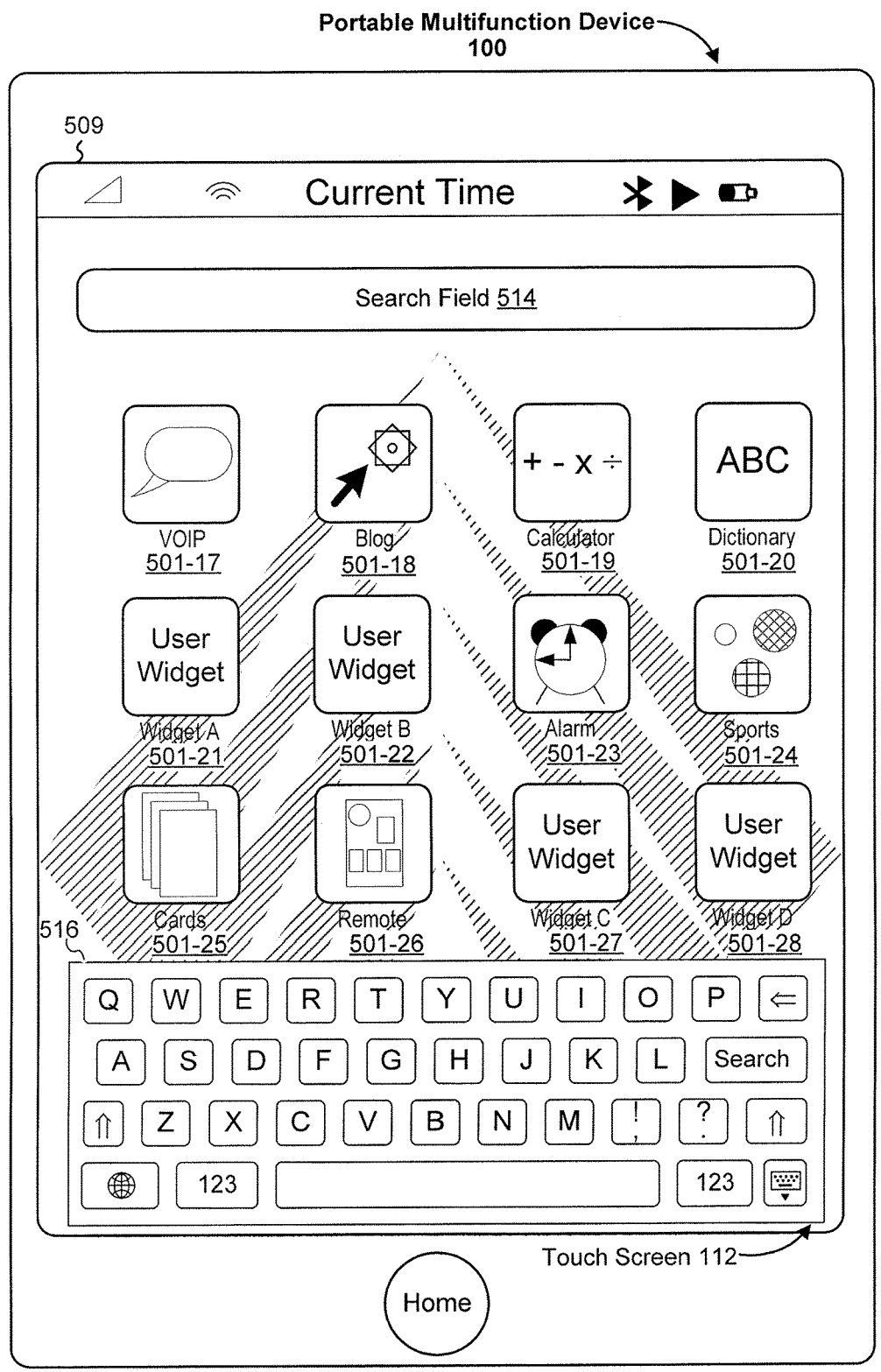
Figure 5J:
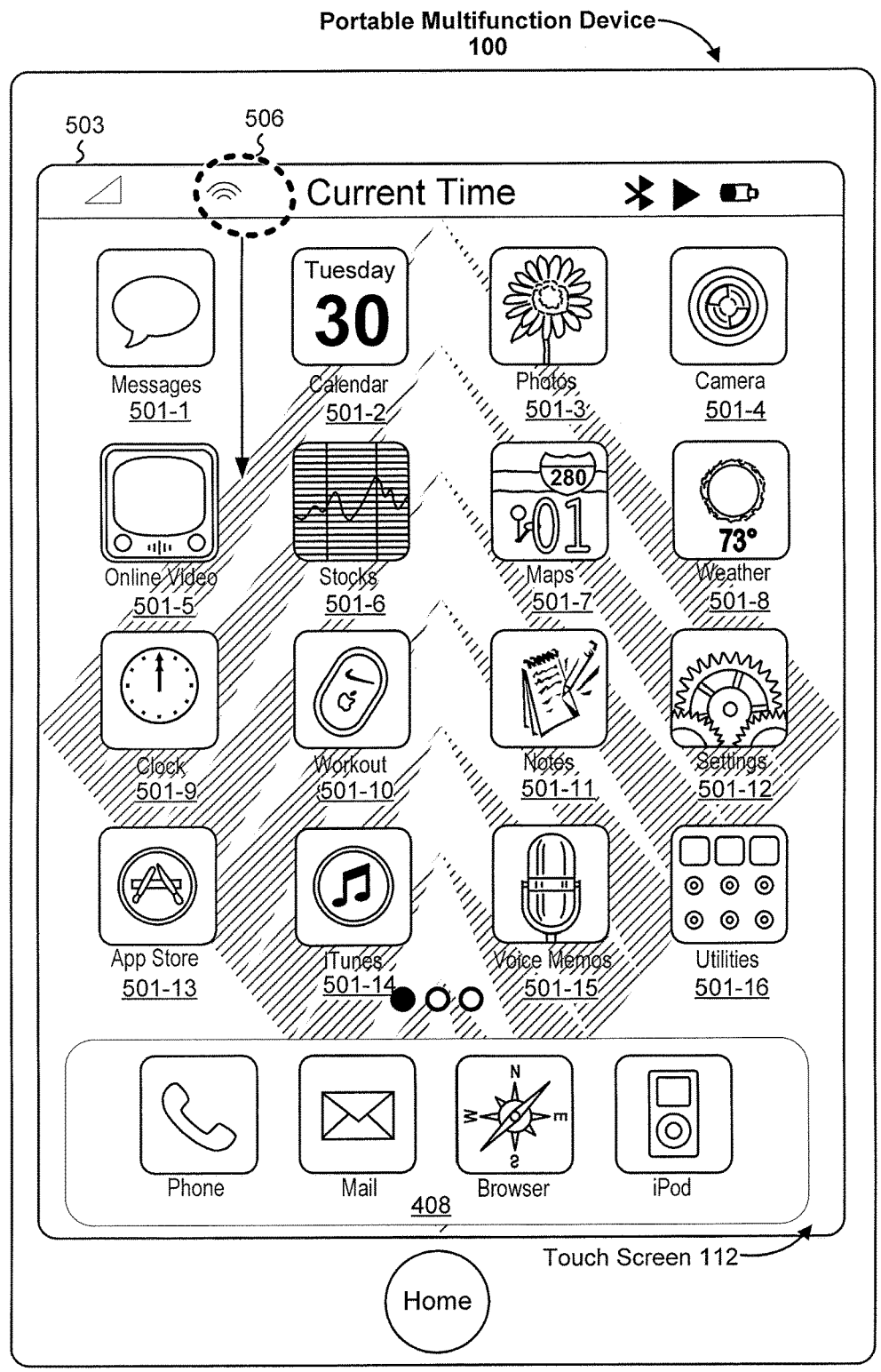
Figure 5K:
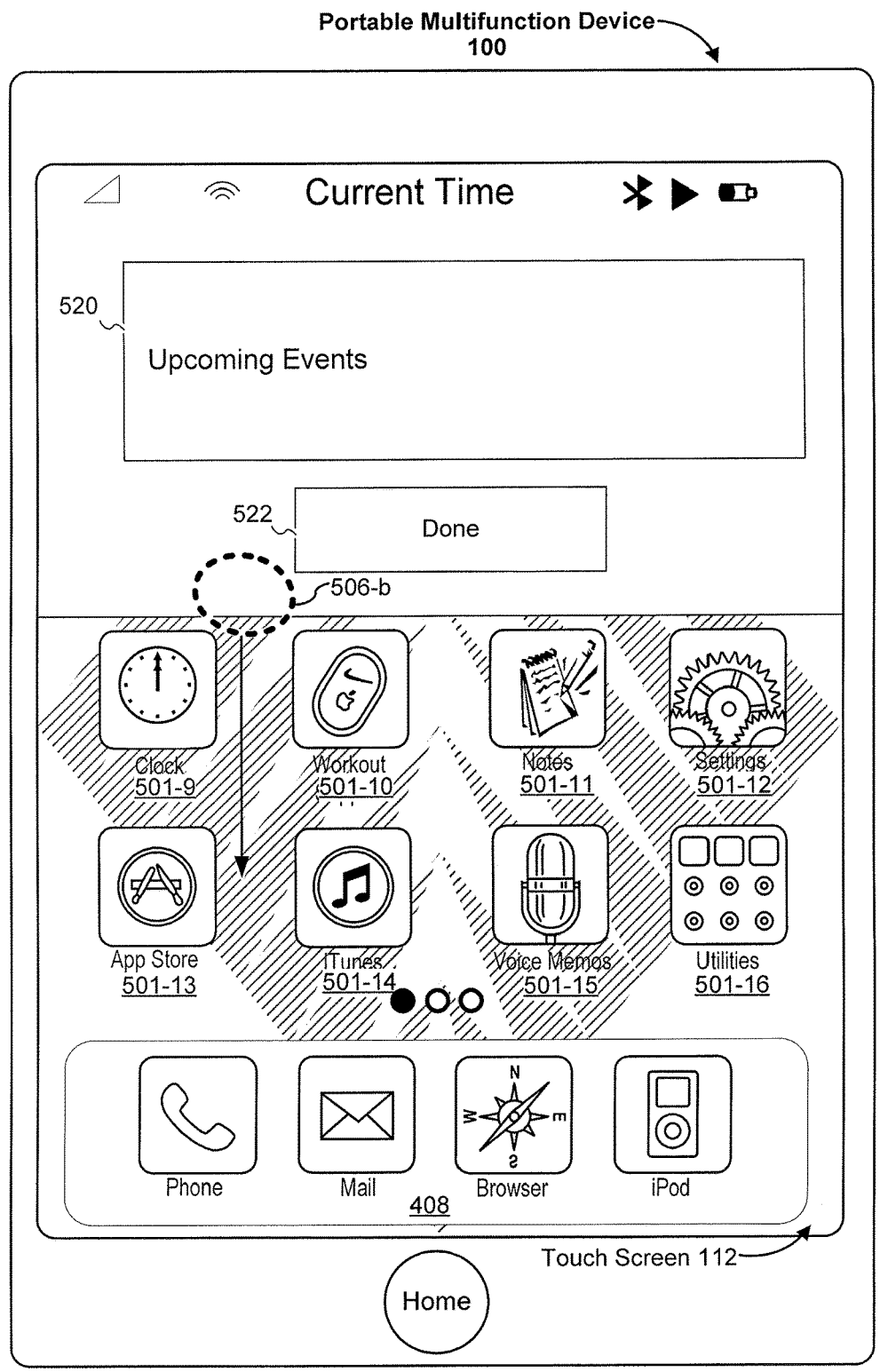
Figure 5L:
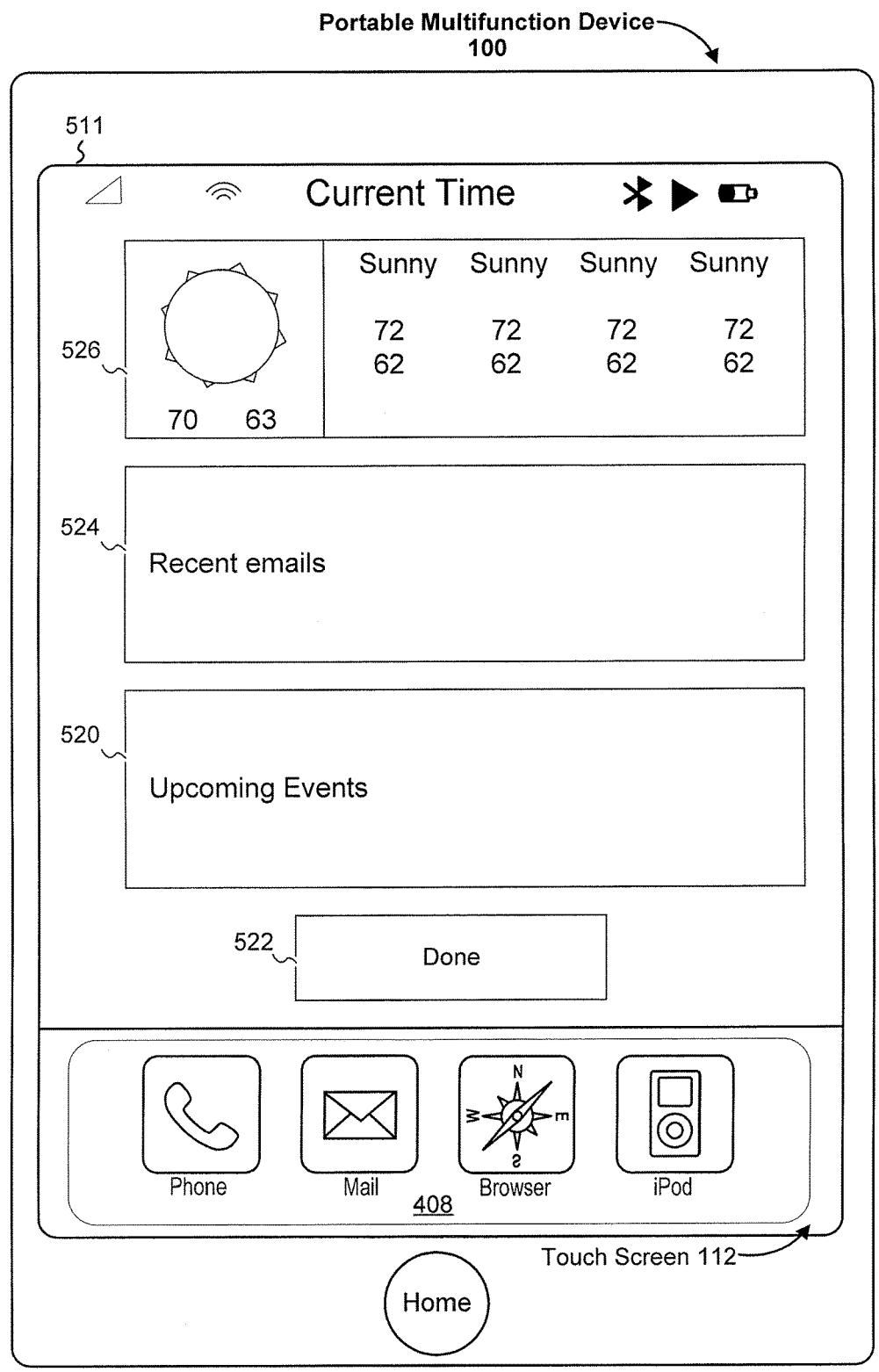
Figure 5M:
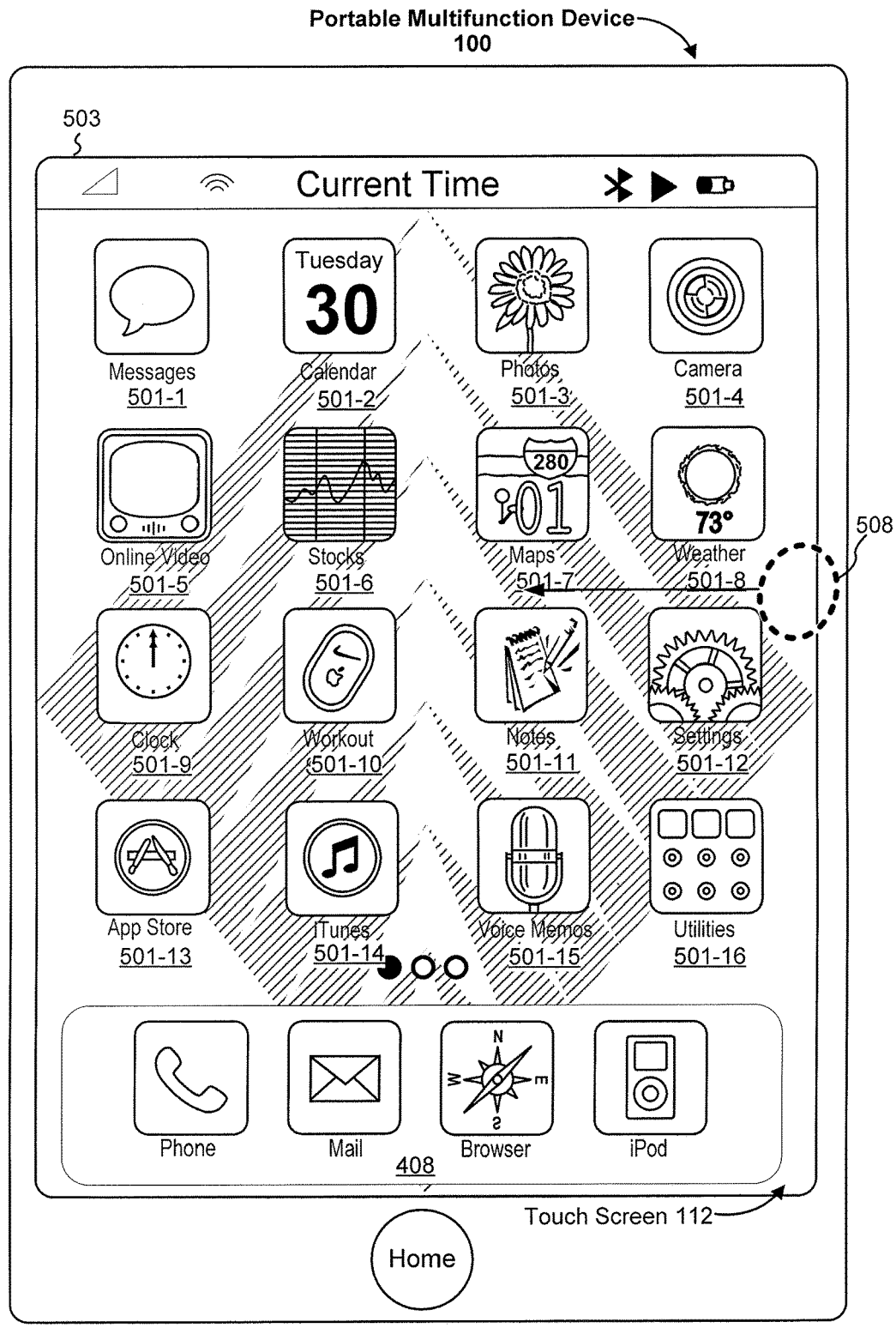
Figure 5N:
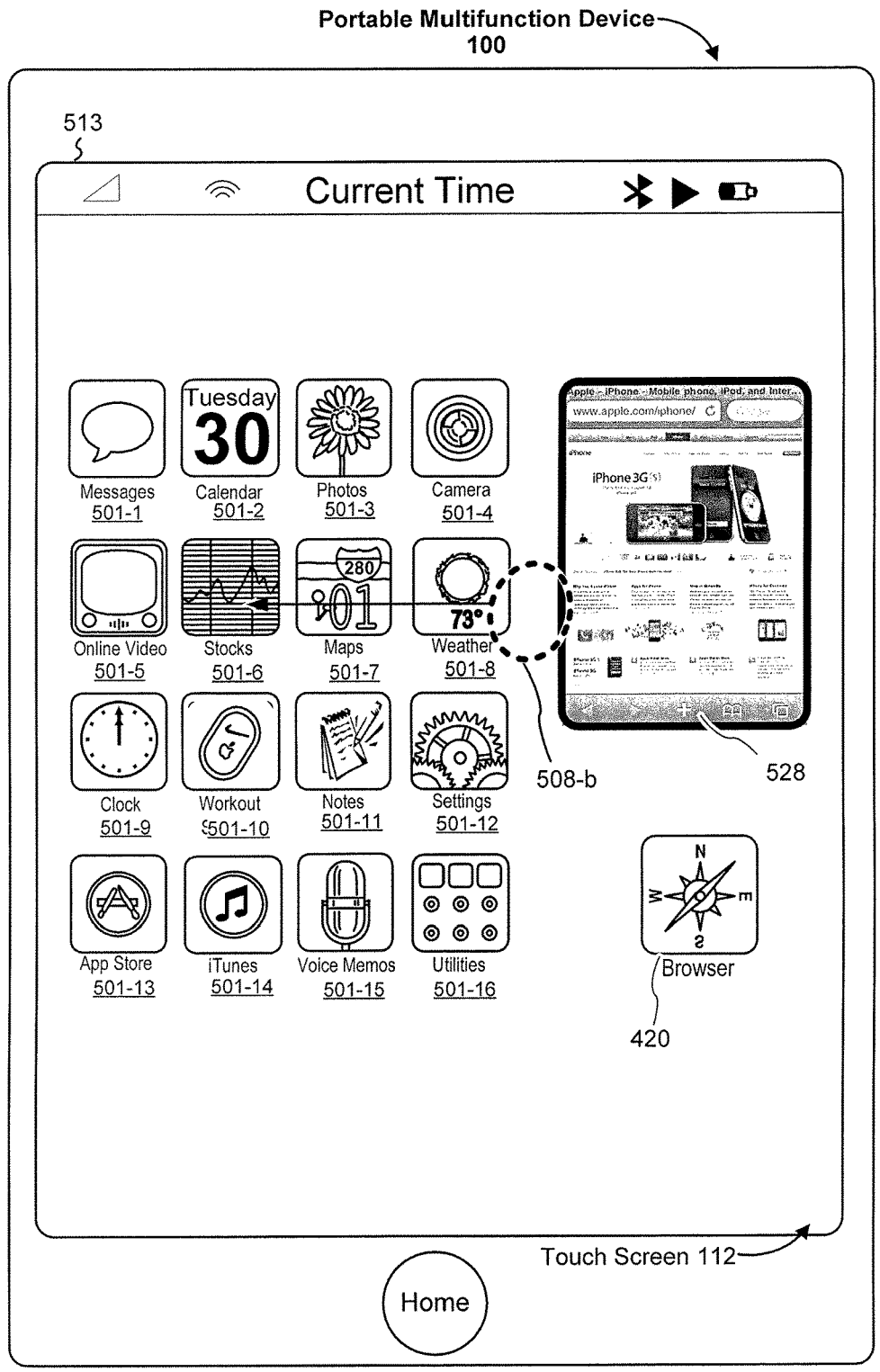
Figure 5O:
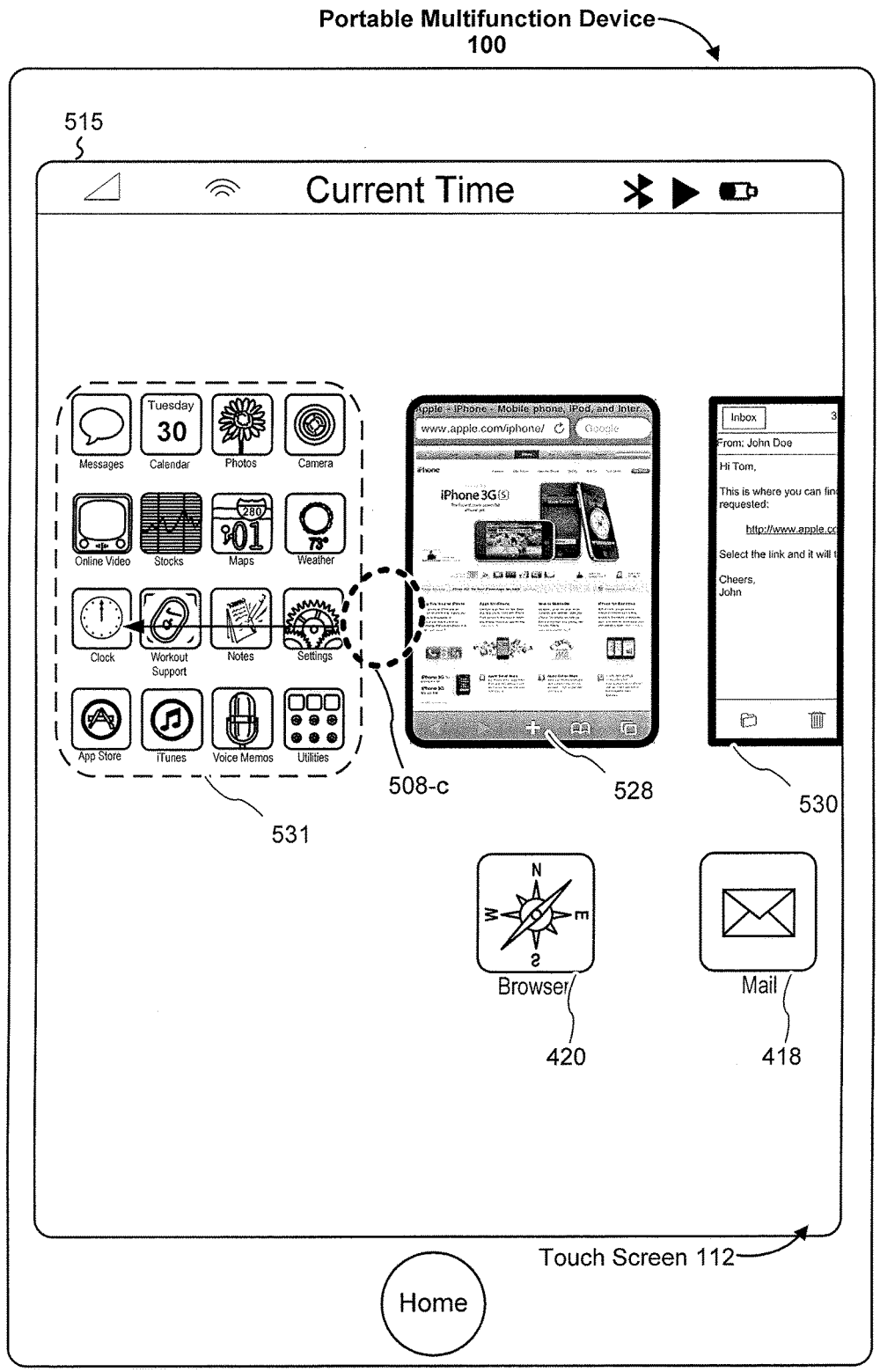
Figure 5P:
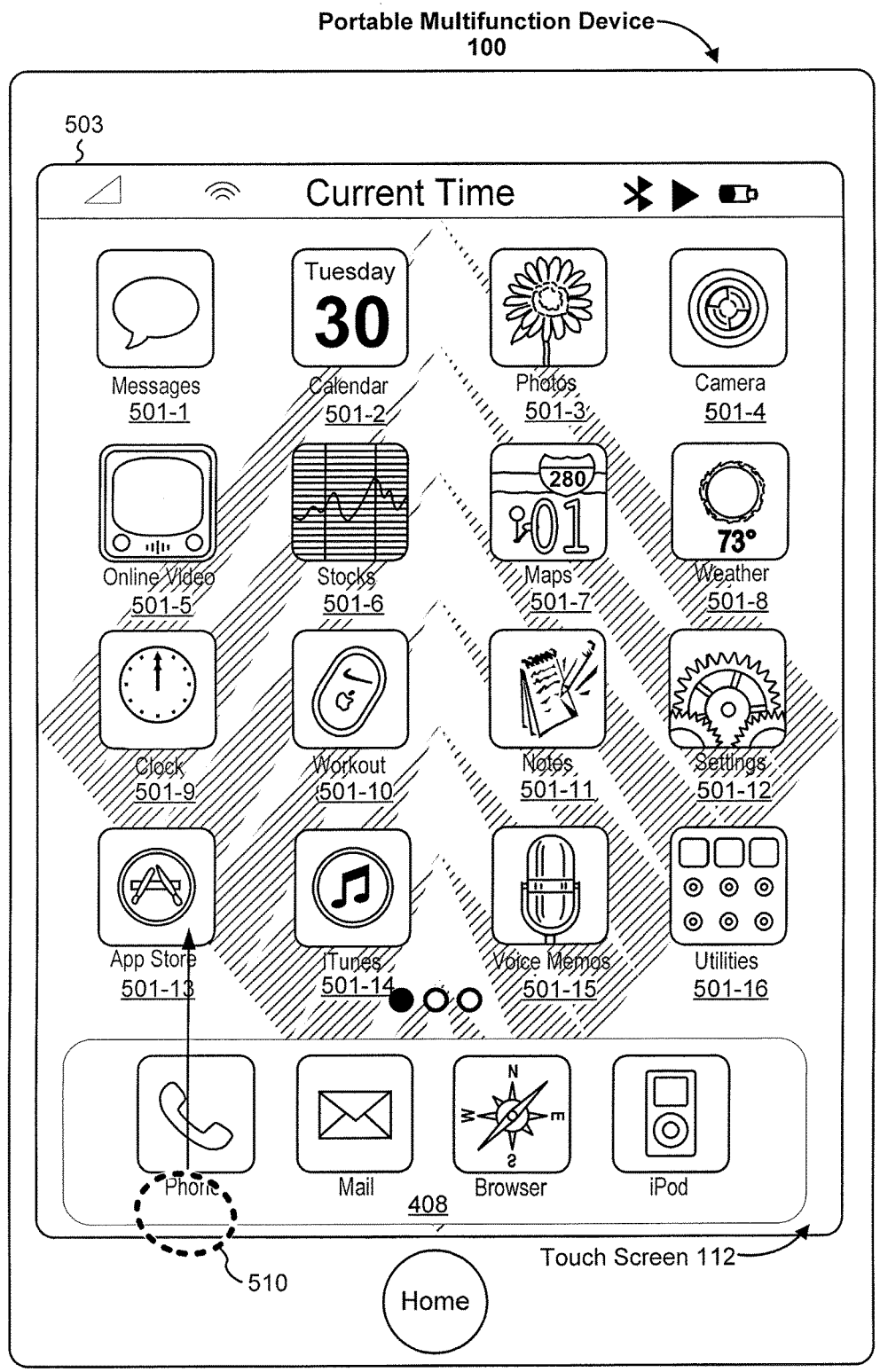
Figure 5Q:
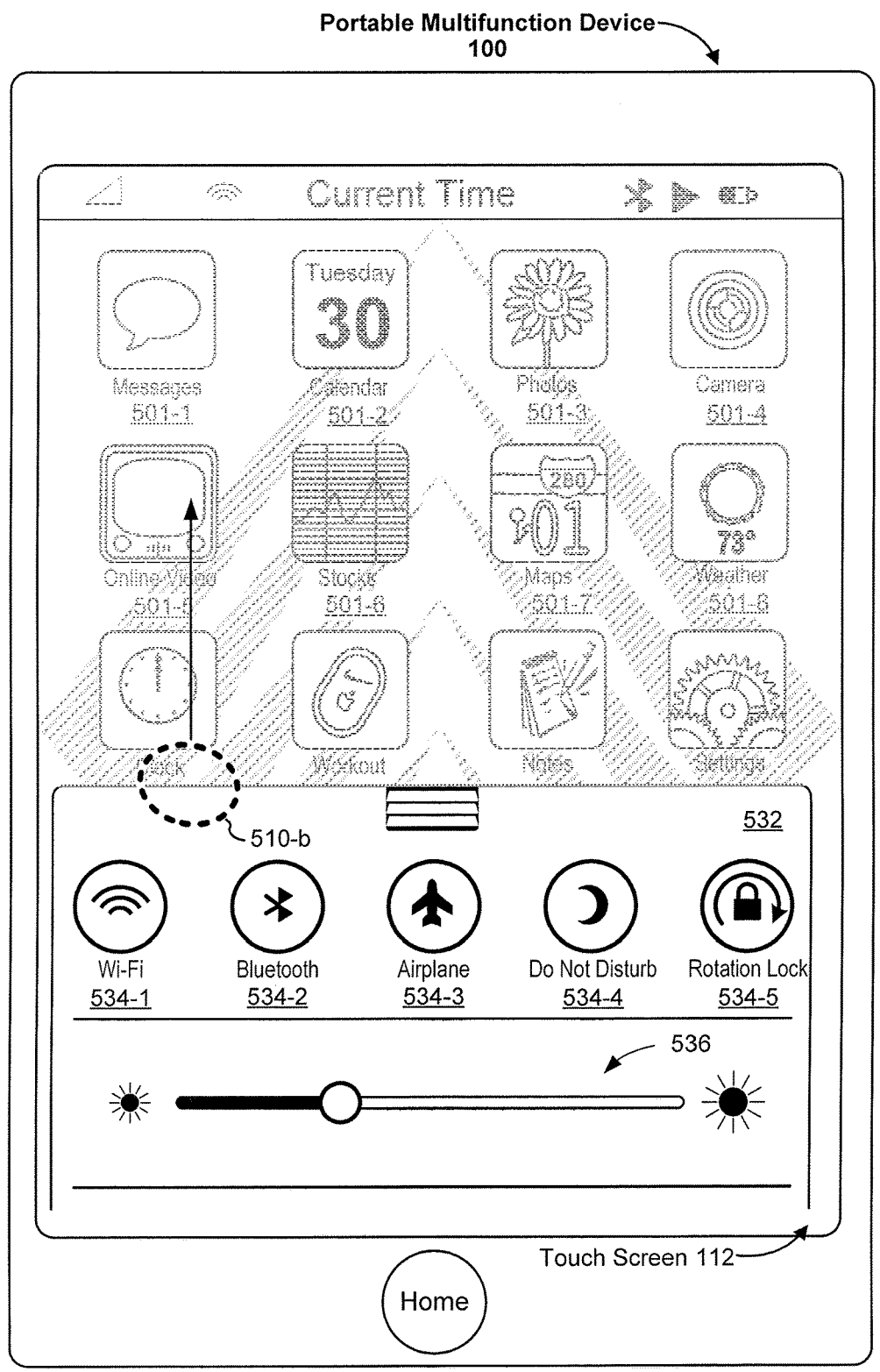
Figure 5R:
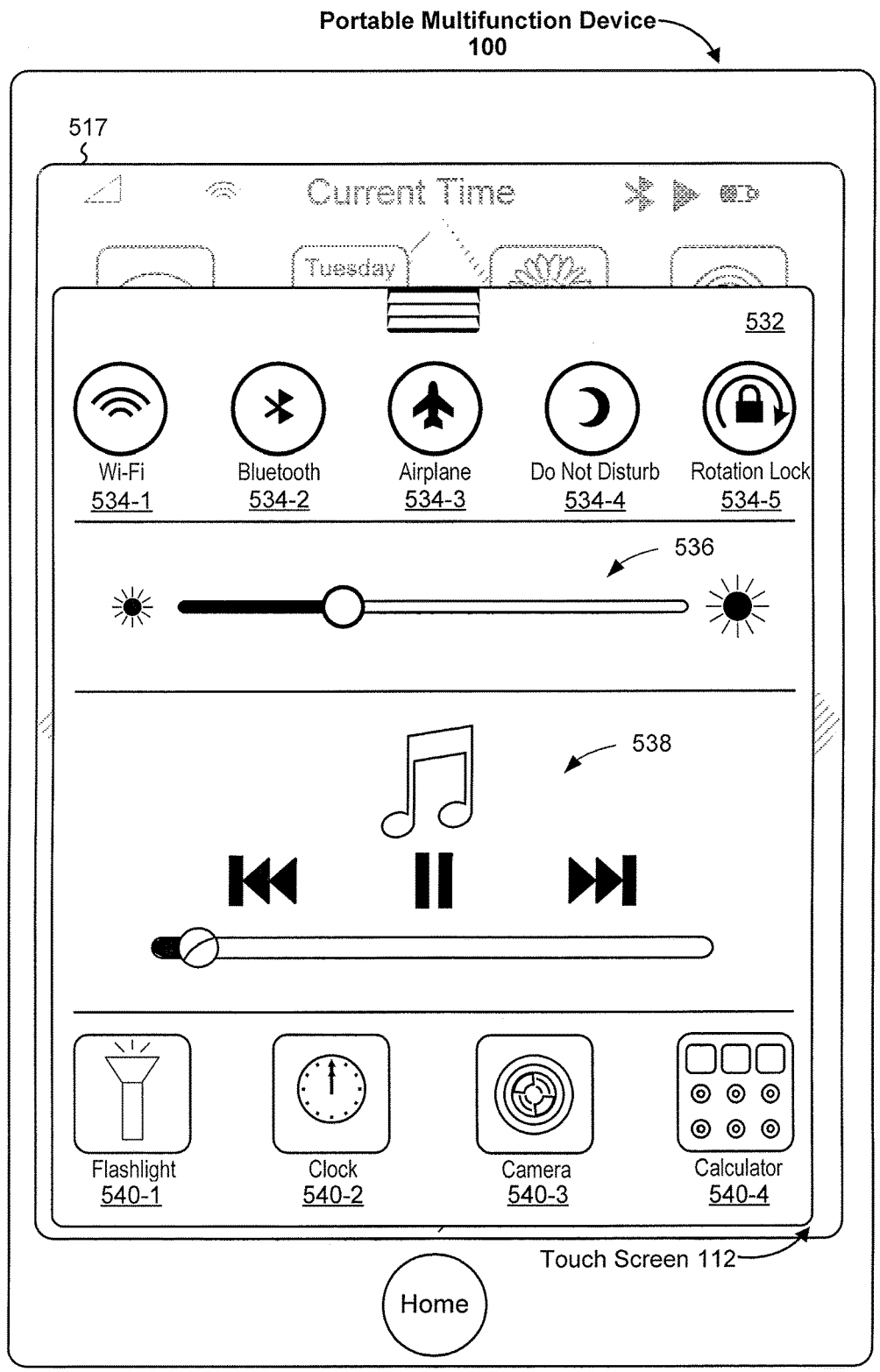
Figure 6A:
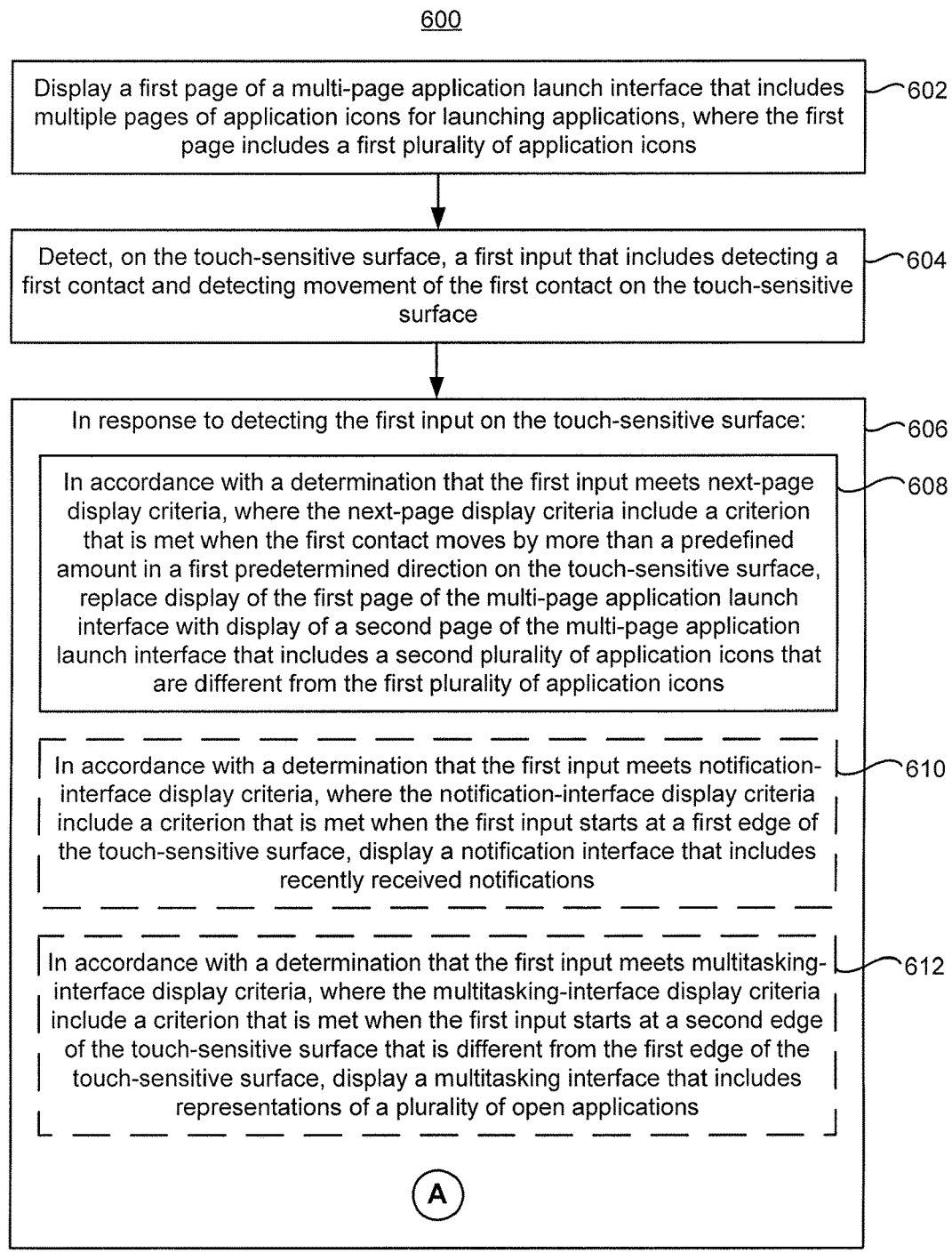
FIGS. 6A-6D are flow diagrams illustrating a method of providing access to different functionalities including navigation and search functionalities in accordance with some embodiments.
Figure 6B:
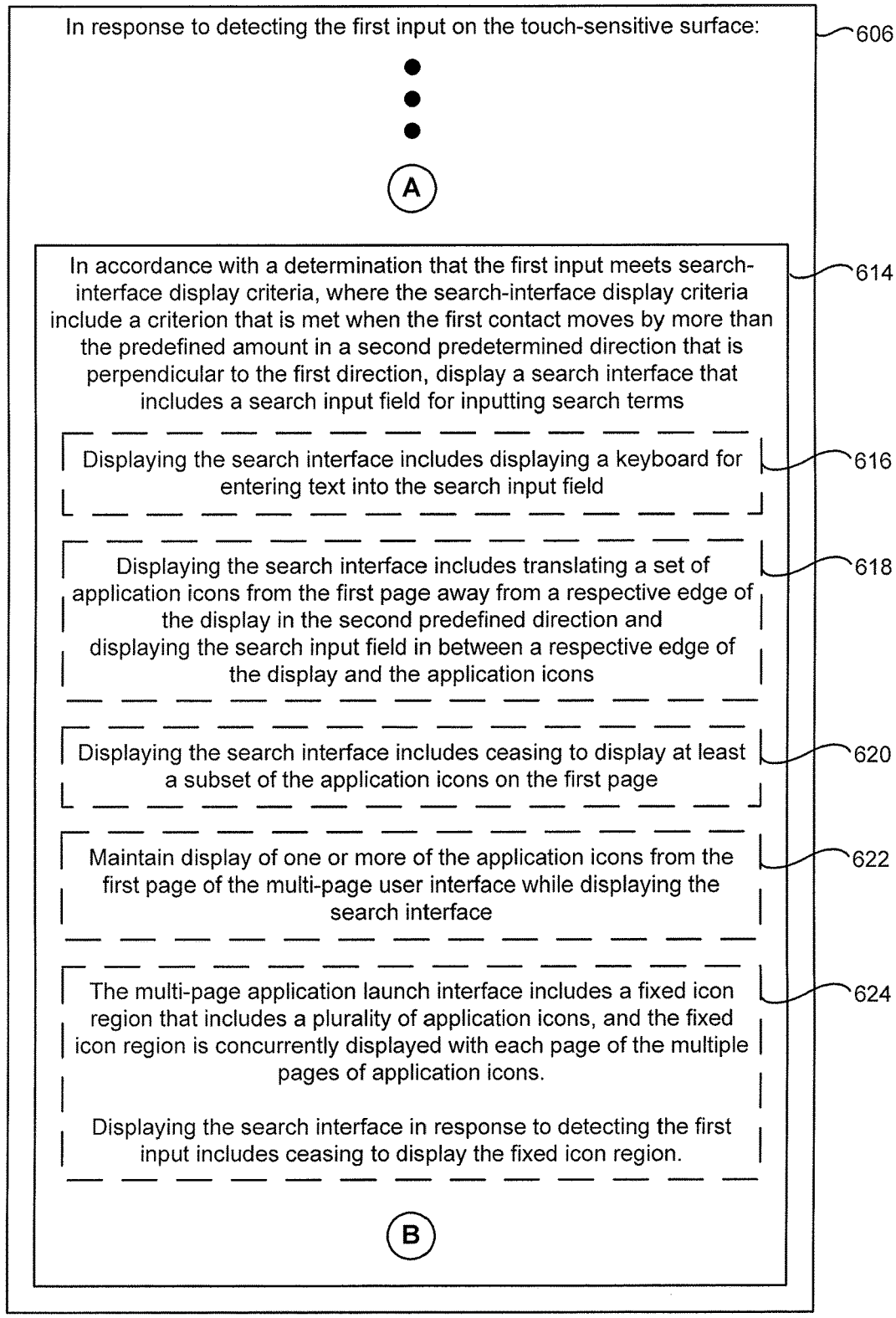
Figure 6C:
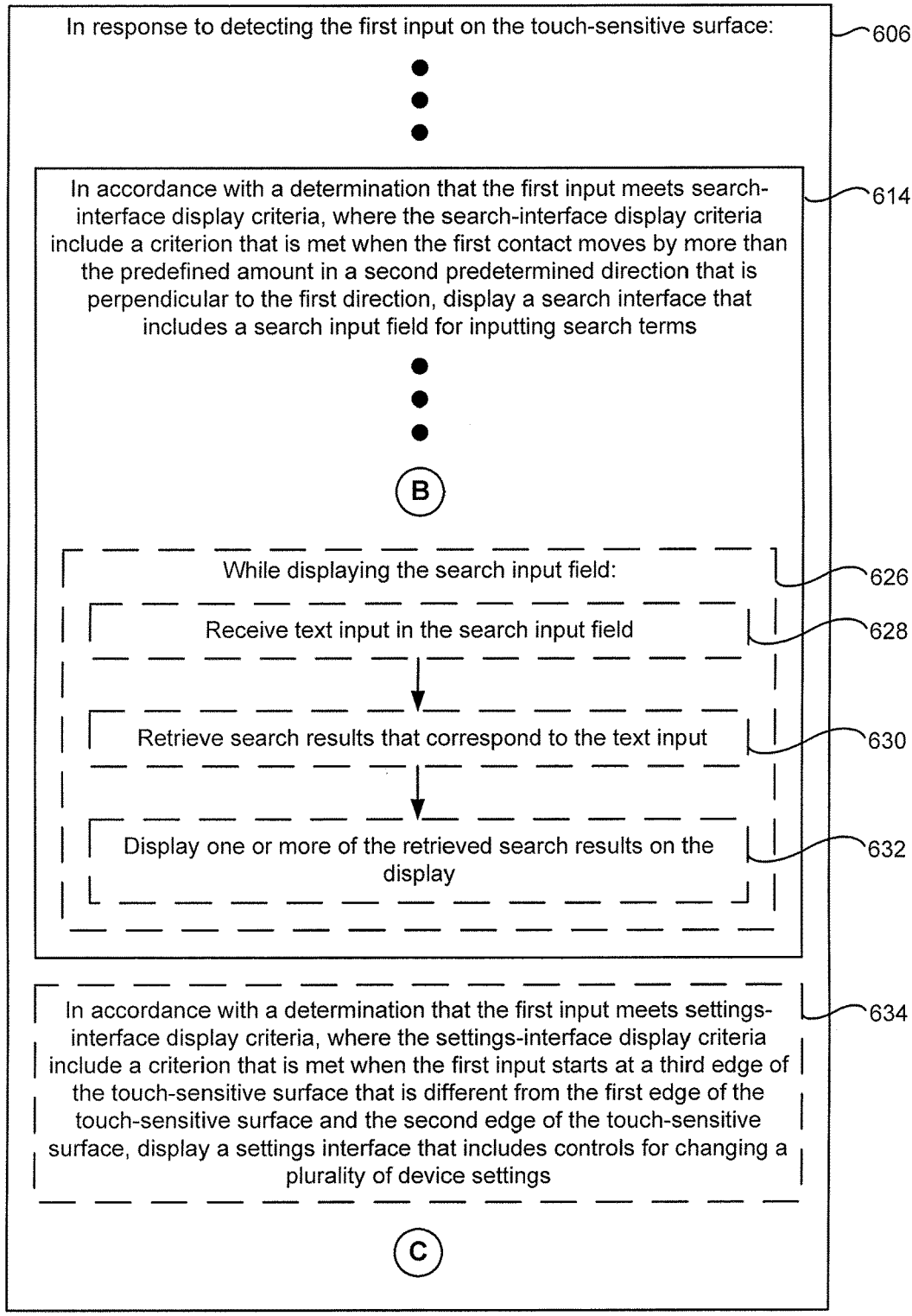
Figure 6D:
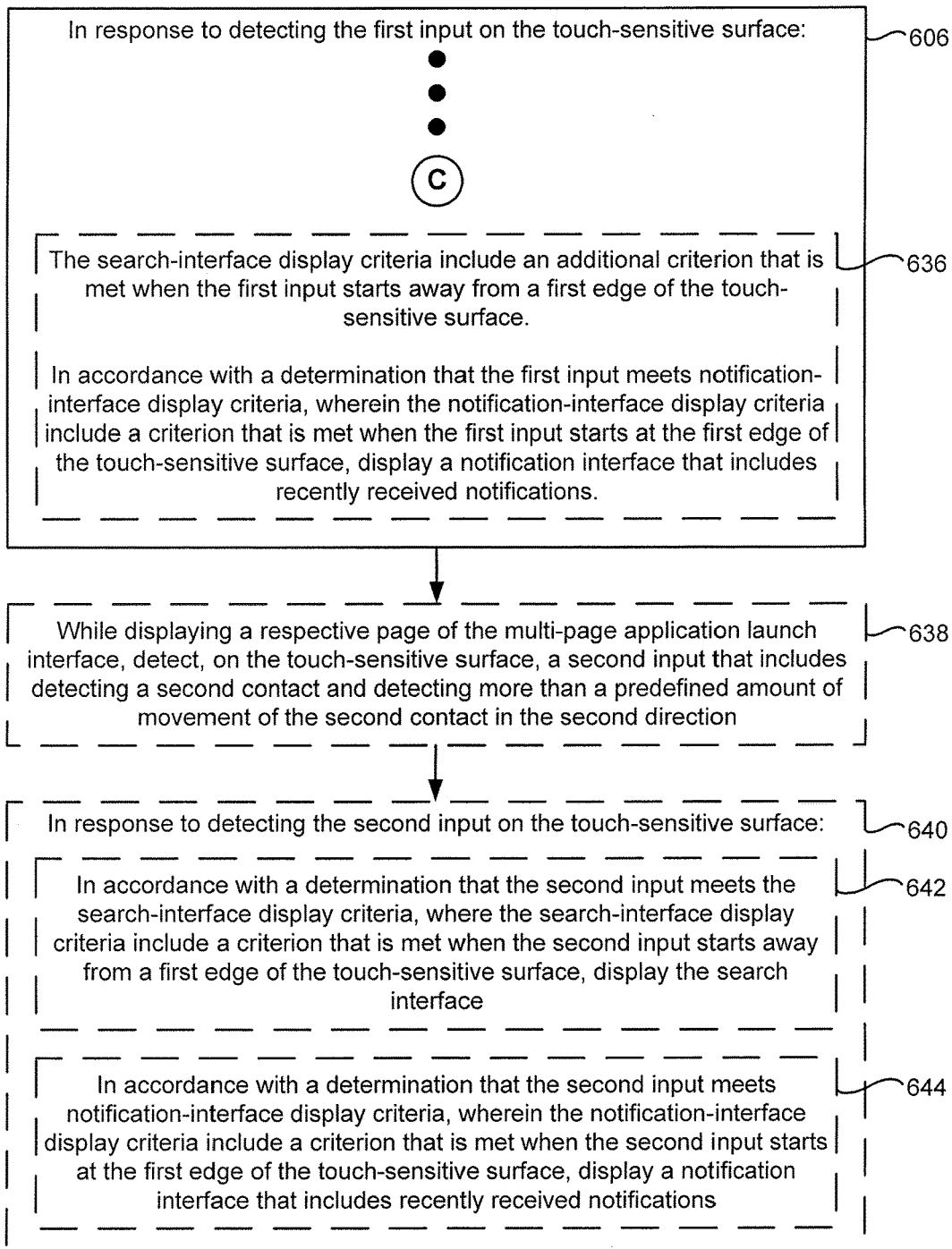

FIGS. 5H-5I illustrate another example of displaying a search interface that includes a search input field. FIG. 5H shows user interface 505 and detection of input 518. Input 518 includes a contact (away from the top edge of touch screen 112) and movement downward. FIG. 5I shows search interface 509 including search field 514 and keyboard 516 (e.g., the device displays a search interface in response to detecting a downward swipe gesture that starts at a location that is away from a top edge of touch screen 112 and was detected while a second page of the multi-page application launch interface was displayed on the display). Thus, in some embodiments, the search interface for searching documents, applications and other content stored at device 100 is directly accessible in any of a plurality of different pages in a multi-page application launch interface in response to detecting a downward swipe gesture that starts at a location that is away from a top edge of touch screen 112.

FIGS. 5J-5L illustrate an example of displaying a notification center interface. FIG. 5J shows user interface 503 and detection of input 506. Input 506 includes a contact detected at the top edge of touch screen 112 and movement of the contact downward. FIG. 5K illustrates input 506 at position 506-b and the corresponding transition between user interface 503 and notification interface 511, including events content 520 and done affordance 522. FIG. 5L shows notification interface 511 including events content 520, email content 524, weather forecasting content 526, and done affordance 522 (e.g., the device displays a notification center in response to detecting a downward swipe gesture that starts at a top edge of touch screen 112).

FIGS. 5M-5O illustrate an example of displaying a multitasking interface. FIG. 5M shows user interface 503 and detection of input 508. Input 508 includes a contact detected at the right edge of touch screen 112 and movement of the contact to the left. FIG. 5N illustrates input 508 at position 506-b and multitasking interface 513, including a representation of a web browser application 528 and browser application icon 420 either of which, when activated, cause the device to display the browser application (e.g., in a full-screen mode of operation). FIG. 5O illustrates input 508 at position 506-c and multitasking interface 515 including continuing to display the representation of a web browser application 528 and browser application icon 420, and additionally, displaying a representation of an email application 530, and email application icon 418 either of which, when activated, cause the device to display the email application (e.g., in a full-screen mode of operation). Thus, in some embodiments, the device displays a multitasking interface in response to detecting a horizontal (e.g., leftward or rightward) swipe gesture that starts at a vertical edge of touch screen 112). In some embodiments, the row of application icons (e.g., icons 420 and 418) is configured to slide horizontally on the display in response to horizontal swipe inputs on the row of application icons. In some embodiments, the row of application representations (e.g., representations 528 and 530) is configured to slide horizontally on the display in response to horizontal swipe inputs on the row of application Icons.

In some embodiments, if the reduced scale representation 531 of a page of multi-page application launch interface is activated (e.g., in response to detecting a tap gesture at a location on touch screen 112 that corresponds to the reduced scale representation 531 of the page of the multi-page application launch interface), the device ceases to display the multitasking interface and redisplays the corresponding page in the multi-page application launch interface (e.g., FIG. 5M).

FIGS. 5P-5R illustrate an example of displaying a settings interface. FIG. 5P shows user interface 503 and detection of input 510. Input 510 includes a contact detected at the bottom edge of touch screen 112 and movement of the contact upward. FIG. 5Q illustrates input 510 at position 510-b and the corresponding transition between user interface 503 and settings interface 517 (e.g., a control center interface), including device icons 534 and brightness slider 536. FIG. 5R shows settings interface 517 including device icons 534, brightness slider 536, music controls 538 and application icons 540 (e.g., the device displays a settings interface in response to detecting an upward swipe gesture that starts at a bottom edge of touch screen 112).

FIGS. 6A-6D are flow diagrams illustrating a method 600 of providing access to different functionalities including navigation and search functionalities in accordance with some embodiments. Method 600 is performed at an electronic device (e.g., device 300, FIG. 3, or portable multifunction device 100, FIG. 1A) with a display and a touch-sensitive surface. In some embodiments, the display is a touch screen display (e.g., touch screen 112) and the touch-sensitive surface is on the display. In some embodiments, the display is separate from the touch-sensitive surface. Some operations in method 600 are, optionally, combined and/or the order of some operations is, optionally, changed.

As described below, method 600 provides an intuitive way to provide direct access to multiple functionalities from a multi-page application launch interface. The method reduces the cognitive burden on a user when using navigation and search functionalities, thereby creating a more efficient human-machine interface. For battery-operated electronic devices, enabling a user to navigation and search faster and more efficiently conserves power and increases the time between battery charges.

An electronic device that includes a display and a touch-sensitive surface displays (602) a first page of a multi-page application launch interface that includes multiple (separately displayed) pages of application icons for launching applications, where the first page includes a first plurality of application icons. In some embodiments, the touch-sensitive surface described herein is part of a touch screen display. In some embodiments, the touch-sensitive surface described herein is a sub-region of a larger touch-sensitive surface, and the "edges" of the touch-sensitive surface described below correspond to edges of the sub-region of the larger touch-sensitive surface. For example, a device includes a larger touch-sensitive surface that is co-incident with a display of the device and also extends onto a bezel of the device and the "touch-sensitive surface" described herein is a sub-region of the larger touch-sensitive device that is co-incident with the display, so that the edges of the touch-sensitive surface also correspond to edges of the display (sometimes called a touch screen display). In some embodiments, the one or more pages of the application launch interface include one or more bookmark icons, widgets, folder icons and/or other controls for controlling various functions of the device in addition to the application icons that, when activated, launch corresponding applications. For example, FIG. 5A illustrates device 100 displaying user interface 503 (e.g., page 1 of a three page application launch interface) and FIG. 5D illustrates device 100 displaying user interface 505 (e.g., page 2 of the three page application launch interface).

The device detects (604), on the touch-sensitive surface, a first input (e.g., finger gesture) that includes detecting a first contact and detecting movement of the first contact on the touch-sensitive surface. For example, FIG. 5A illustrates device 100 detecting inputs 502, 504, 506, 508, and 510 where each input includes a contact and movement of the contact on touch screen 112.

In response to detecting the first input on the touch-sensitive surface (606), in accordance with a determination that the first input meets next-page display criteria, where the next-page display criteria include a criterion that is met when the first contact moves by more than a predefined amount (e.g., 10, 20, 30, 50, or 100 pixels) in a first predetermined direction (e.g., right to left) on the touch-sensitive surface, the device replaces (608) display of the first page of the multi-page application launch interface with display of a second page of the multi-page application launch interface that includes a second plurality of application icons that are different from (or distinct from) the first plurality of application icons. For example, FIGS. 5B-5D illustrate device 100 detecting input 502 on touch screen 112 and replacing of user interface 503 (e.g., page 1) with user interface 505 (e.g., page 2). FIG. 5D further illustrates user interface 505 including a plurality of application icons 501 (e.g., application icons 501-17 through 501-29) that are distinct from the plurality of application icons 501 (e.g., application icons 501-1 through 501-16) included in user interface 503 (FIG. 58).

In some embodiments, in response to detecting the first input (606), in accordance with a determination that the first input meets notification-interface display criteria, where the notification-interface display criteria include a criterion that is met when the first input starts a first edge (e.g., a top) of the touch-sensitive surface, the device displays (610) a notification interface that includes recently received notifications. In some embodiments, the notification-interface criteria include a criterion that is met when the first input starts proximate to the first edge of the touch-sensitive surface, such as within a predefined distance (e.g., 0.1-1.0 mm) or a predefined number of pixels (e.g., 1-20 pixels) of the first edge of the touch-sensitive surface. For example, FIG. 5I illustrates device 100 detecting input 506, including a contact on the top edge of touch screen 112 and subsequent downward movement of the contact. FIGS. 5K-5L illustrate device 100 replacing display of user interface 503 (e.g., page 1) with display of notification interface 511. FIG. 5L further illustrates notification interface 511 including email content 524 (e.g., providing notification of recently received emails) and events content 520 (e.g., providing notification of upcoming events).

In some embodiments, in response to detecting the first input (606), in accordance with a determination that the first input meets multitasking-interface display criteria, where the multitasking-interface display criteria include a criterion that is met when the first input starts (e.g., the first contact is initially detected) at a second edge of the touch-sensitive surface that is different from the first edge of the touch-sensitive surface, the device displays (612) a multitasking interface that includes representations of a plurality of open applications. In some embodiments, the multitasking-interface display criteria include a criterion that is met when the first input starts proximate to the second edge of the touch-sensitive surface, such as within a predefined distance (e.g., 0.1-1.0 mm) or a predefined number of pixels (e.g., 1-20 pixels) of the second edge of the touch-sensitive surface. In some embodiments, the multitasking interface can be used to switch between open applications and/or close open applications. In some embodiments, the multitasking interface includes a reduced scale representation of a respective page of the multipage application launch interface (e.g., at one end of a row of representations of a plurality of open applications) that, when selected, causes the device to display the respective page of the multipage application launch interface. For example, FIG. 5M illustrates device 100 detecting input 508, including detecting a contact on the right edge of touch screen 112 and subsequent movement of the contact to the right on touch screen 112. FIGS. 5N-5O illustrate device 100 replacing display of user interface 503 (e.g., page 1) with display of multitasking interface 513 in FIG. 5N and display of multitasking interface 515 in FIG. 5O. FIG. 5O further illustrates multitasking interface 513 including a plurality of open applications (e.g., browser window 528 and email window 530).

In response to detecting the first input on the touch-sensitive surface (606), in accordance with a determination that the first input meets search-interface display criteria, where the search-interface display criteria include a criterion that is met when the first contact moves by more than the predefined amount (e.g., 10, 20, 30, 50, or 100 pixels) in a second predetermined direction (e.g., down) that is perpendicular to the first direction, the device displays (614) a search interface that includes a search input field for inputting search terms. For example, FIG. 5E illustrates device 100 detecting input 504, including detecting a contact and subsequent movement of the contact downward on touch screen 112 (e.g., perpendicular to the movement of input 502 shown in FIG. 5B). FIGS. 5F-5G illustrate device 100 at least partially replacing display of user interface 503 (e.g., page 1) with display of search interface 507, including search field 514 (e.g., sliding wallpaper and application icons 501 downward to reveal search field 514. In some embodiments search field is pulled out from "under" a device status bar that includes a current time and battery status and other device status information. FIGS. 5H-5I illustrate a similar example. In FIGS. 5H-5I, device 100 detects input 518 and at least partially replaces display of user interface 505 (e.g., page 2) with display of search interface 509.

In some embodiments, displaying the search interface includes (616) displaying a keyboard for entering text into the search input field. In some embodiments, the keyboard and the search input field are both displayed in response to detecting the first input. In some embodiments, the keyboard is displayed in response to detecting selection/activation (e.g., with a tap gesture) of the search input field. For example, FIG. 5G shows device 100 displaying search interface 507 including keyboard 516.

In some embodiments, displaying the search interface includes (618) translating a set of application icons from the first page away from a respective edge of the display in the second predefined direction, and displaying the search input field in between a respective edge (e.g., a top edge) of the display and the application icons. For example, FIGS. 5E-5G illustrate device 100 transitioning from user interface 503 to search interface 507 including translating application icons 501 downward and displaying search field 514 above them.

In some embodiments, displaying the search interface includes (620) ceasing to display at least a subset of the application icons on the first page. In some embodiments, all of the application icons fade out, are covered up, or are otherwise removed from the display. In some embodiments, some of the application icons are covered by a keyboard or other portion of the search interface, while other application icons continue to be displayed on the display concurrently with the search interface. For example, FIGS. 5E-5G illustrate device 100 transitioning from user interface 503 to search interface 507 including ceasing to display application icons 501-13 through 501-16 in FIG. 5G.

In some embodiments, in response to detecting the first input (606), the device maintains (622) display of one or more of the application icons from the first page of the multi-page user interface while displaying the search interface. For example, FIGS. 5E-5G illustrate device 100 transitioning from user interface 503 to search interface 507 and maintaining display of application icons 501-1 through 501-12 in search interface 507.

In some embodiments, the multi-page application launch interface includes (624) a fixed icon region (e.g., an application dock) that includes a plurality of application icons, and the fixed icon region (e.g., the same fixed icon region with the same icons contained therein) is concurrently displayed with each page of the multiple pages of application icons. In some embodiments, displaying the search interface in response to detecting the first input includes ceasing to display the fixed icon region (e.g., sliding the application dock off of the display in the second direction as the search input field is sliding onto the display in the second direction). For example, FIGS. 5E-5G illustrate device 100 transitioning from user interface 503 to search interface 507. FIG. 5E illustrates device 100 displaying user interface 503 including tray 408 (e.g., an application dock) and FIG. 5G illustrates device 100 displaying user interface 507 and ceasing to display tray 408. In some embodiments, tray 408 is covered when keyboard appears (e.g., slides up from a bottom of touch screen 112). In some embodiments, tray 408 slides down off of touch screen 112 while search field 514 is sliding down onto touch screen 112 (e.g., from under the device status bar that includes the current time and battery status).

In some embodiments, while displaying the search input field (626): the device receives (628) text input in the search input field (e.g., text that corresponds to a plurality of character key press operations or a cut and paste operation); retrieves (630) search results that correspond to the text input; and displays (632) one or more of the retrieved search results on the display. In some embodiments, the search results are search results that correspond to applications and content stored on the device. In some embodiments, the search results are search results that correspond to content stored remote from the device (e.g., webpages or media streams that are available for streaming to the device). In some embodiments, the search results are retrieved automatically in response to receiving the text input. In some embodiments, the search results are retrieved in response to detecting selection of a search execution affordance displayed in the search user interface (e.g., a "Search" button on a keyboard used to enter the text input in the search field). In some embodiments, in response to detecting selection of a respective search result, the device displays content that corresponds to the respective search result (e.g., the device displays a user interface for a selected application or content that corresponds to the selected search result).

In some embodiments, in response to detecting the first input (606), in accordance with a determination that the first input meets settings-interface display criteria, where the settings-interface display criteria include a criterion that is met when the first input starts (e.g., the first contact is initially detected) at a third edge of the touch-sensitive surface that is different from the first edge of the touch-sensitive surface and the second edge of the touch-sensitive surface, the device displays (634) a settings interface that includes controls for changing a plurality of device settings. In some embodiments, the settings-interface display criteria include a criterion that is met when the first input starts proximate to the third edge of the touch-sensitive surface, such as within a predefined distance (e.g., 0.1-1.0 mm) or a predefined number of pixels (e.g., 1-20 pixels) of the third edge of the touch-sensitive surface. In some embodiments, the settings interface can be used to change frequently used device settings such as screen brightness, volume, airplane mode, and turning on/off wireless communication. For example, FIG. 5P illustrates device 100 detecting input 510, including a contact on the bottom edge of touch screen 112 and subsequent movement of the contact upward on touch screen 112. FIGS. 5Q-5R illustrate device 100 at least partially replacing display of user interface 503 (e.g., page 1) with display of settings interface 517 (e.g., a control center interface). FIG. 5R further illustrates settings interface 517 including a plurality of controls for changing device settings (e.g., brightness slider 536. music controls 538, and device icons 534).

In some embodiments, the search-interface display criteria include (636) an additional criterion that is met when the first input starts (e.g., the second contact is initially detected) away from a first edge (e.g., a top) of the touch-sensitive surface. For example, the search-interface display criteria include at least a first criterion that is met when the contact moves by more than the predefined amount in the first direction and a second criterion that is met when the contact starts away from the first edge of the touch-sensitive surface.

In some embodiments, the first input is determined to start "away from" the first edge when the first input starts (e.g., the contact in the first input is initially detected at a location that is) more than a predefined distance away from the first edge (e.g., 0.1-1.0 mm) or more than a predefined number of pixels away from the first edge (e.g., 1-20 pixels). In some embodiments, in accordance with a determination that the first input meets notification-interface display criteria, where the notification-interface display criteria include a criterion that is met when the first input starts (e.g., the first contact is initially detected) at the first edge (e.g., a top) of the touch-sensitive surface, the device displays a notification interface that includes recently received notifications (e.g., instant messages, emails, social network messages, application status updates, etc.). In some embodiments, the notification-interface display criteria include a criterion that is met when the first input starts proximate to the first edge of the touch-sensitive surface, such as within a predefined distance (e.g., 0.1-1.0 mm) or a predefined number of pixels (e.g., 1-20 pixels) of the first edge of the touch-sensitive surface. For example, FIG. 5J shows device 100 detecting input 506 starting at the top edge of touch screen 112. Consequently, FIGS. 5K-5L illustrate device 100 replacing display of user interface 503 with notification interface 511. In a contrasting example, FIG. 5E shows device 100 detecting input 504 starting away from the top edge of touch screen 112. Consequently, FIGS. 5F-5G illustrate device 100 replacing display of user interface 503 with search interface 507.

In some embodiments, while displaying a respective page of the multi-page application launch interface, the device detects (638), on the touch-sensitive surface, a second input (e.g., finger gesture) that includes detecting a second contact (different from the first contact) and detecting more than a predefined amount of movement (e.g., 10, 20, 30, 50, or 100 pixels) of the second contact in the second direction (e.g., downward).

In some embodiments, in response to detecting the second input on the touch-sensitive surface (640), in accordance with a determination that the second input meets the search-interface display criteria, where the search-interface display criteria include a criterion that is met when the second input starts (e.g., the second contact is initially detected) away from (e.g., not proximate to) a first edge (e.g., a top) of the touch-sensitive surface, the device displays (642) the search interface. In some embodiments, the first input is determined to start "away from" the first edge when the first input starts (e.g., the contact in the first input is initially detected at a location that is) more than a predefined distance away from the first edge (e.g., 0.1-1.0 mm) or more than a predefined number of pixels away from the first edge (e.g., 1-20 pixels).

In some embodiments, in response to detecting the second input on the touch-sensitive surface (640), in accordance with a determination that the second input meets notification-interface display criteria, where the notification-interface display criteria include a criterion that is met when the second input starts (e.g., the first contact is initially detected) at the first edge (e.g., a top) of the touch-sensitive surface, the device displays (644) a notification interface that includes recently received notifications (e.g., instant messages, emails, social network messages, application status updates, etc.). In some embodiments, the notification-interface display criteria include a criterion that is met when the second input starts proximate to the first edge of the touch-sensitive surface, such as within a predefined distance (e.g., 0.1-1.0 mm) or a predefined number of pixels (e.g., 1-20 pixels) of the first edge of the touch-sensitive surface. For example, in response to detecting a first input (e.g., movement of contact 502 in FIG. 5B that meets the next-page display criteria), the device replaces the first page of the multi-page application launch user interface with a second page of the multi-page application launch user interface as shown in FIGS. 5B-5D; and after detecting the first input, the device detects a second input (e.g., downward movement of contact 518 that starts away from an edge of touch screen 112 and meets search-interface display criteria), the device displays the search input interface as shown in FIGS. 5H-5I.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein.

In accordance with some embodiments, FIG. 7 shows a functional block diagram of electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, electronic device 700 includes display unit 701 configured to display a first page of a multi-page application launch interface that includes multiple pages of application icons for launching applications, where the first page includes a first plurality of application icons. Electronic device 700 also includes touch-sensitive 703 surface unit configured to receive user gestures and processing unit 702 coupled to display unit 701 and touch-sensitive surface unit 703. In some embodiments, processing unit 702 includes detecting unit 704, replacing unit 706, display enabling unit 708, receiving unit 710, and retrieving unit 712.

Processing unit 702 is configured to detect (e.g., with detecting unit 704), on the touch-sensitive surface unit, a first input that includes detecting a first contact and detecting movement of the first contact on the touch-sensitive surface unit. Processing unit 702 is further configured to, in response to detecting the first input on the touch-sensitive surface unit: in accordance with a determination that the first input meets next-page display criteria, where the next-page display criteria include a criterion that is met when the first contact moves by more than a predefined amount in a first predetermined direction on the touch-sensitive surface, replace (e.g., with replacing unit 706) display of the first page of the multi-page application launch interface with display of a second page of the multi-page application launch interface that includes a second plurality of application icons that are different from the first plurality of application icons; and in accordance with a determination that the first input meets search-interface display criteria, where the search-interface display criteria include a criterion that is met when the first contact moves by more than the predefined amount in a second predetermined direction that is perpendicular to the first direction, enable display of (e.g., with display enabling unit 708) a search interface that includes a search input field for inputting search terms.

In some embodiments, processing unit 702 is further configured to, in response to detecting the first input, in accordance with a determination that the first input meets notification-interface display criteria, where the notification-interface display criteria include a criterion that is met when the first input starts a first edge of the touch-sensitive surface unit, enable display of (e.g., with display enabling unit 708) a notification interface that includes recently received notifications.

In some embodiments, processing unit 702 is further configured to, in response to detecting the first input, in accordance with a determination that the first input meets multitasking-interface display criteria, wherein the multitasking-interface display criteria include a criterion that is met when the first input starts at a second edge of the touch-sensitive surface unit that is different from the first edge of the touch-sensitive surface unit, enable display of (e.g., with display enabling unit 708) a multitasking interface that includes representations of a plurality of open applications.

In some embodiments, processing unit 702 is further configured to, in response to detecting the first input, in accordance with a determination that the first input meets settings-interface display criteria, wherein the settings-interface display criteria include a criterion that is met when the first input starts at a third edge of the touch-sensitive surface unit that is different from the first edge of the touch-sensitive surface unit and the second edge of the touch-sensitive surface unit, enable display of (e.g., with display enabling unit 708) a settings interface that includes controls for changing a plurality of device settings.

In some embodiments, the search-interface display criteria include an additional criterion that is met when the first input starts away from a first edge of the touch-sensitive surface unit. In some embodiments, processing unit 702 is further configured to, in accordance with a determination that the first input meets notification-interface display criteria, wherein the notification-interface display criteria include a criterion that is met when the first input starts at the first edge of the touch-sensitive surface unit, enable display of (e.g., with display enabling unit 708) a notification interface that includes recently received notifications.

In some embodiments, processing unit 702 is further configured to, while enabling display of a respective page of the multi-page application launch interface, detect (e.g., with detecting unit 704), on the touch-sensitive surface unit, a second input that includes detecting a second contact and detecting more than a predefined amount of movement of the second contact in the second direction. In some embodiments, processing unit 702 is further configured to, in response to detecting the second input on the touch-sensitive surface unit: in accordance with a determination that the second input meets the search-interface display criteria, wherein the search-interface display criteria include a criterion that is met when the second input starts away from a first edge of the touch-sensitive surface unit, enable display of (e.g., with display enabling unit 708) the search interface; and in accordance with a determination that the second input meets notification- interface display criteria, wherein the notification-interface display criteria include a criterion that is met when the second input starts at the first edge of the touch-sensitive surface unit, enable display of (e.g., with display enabling unit 708) a notification interface that includes recently received notifications.

In some embodiments, enabling display of (e.g., with display enabling unit 708) the search interface includes enabling display of a keyboard for entering text into the search input field.

In some embodiments, enabling display of (e.g., with display enabling unit 708) the search interface includes: translating a set of application icons from the first page away from a respective edge of the display unit in the second predefined direction; and enabling display of the search input field in between a respective edge of the display unit and the application icons.

In some embodiments, enabling display of (e.g., with display enabling unit 708) the search interface includes ceasing to display at least a subset of the application icons on the first page.

In some embodiments, processing unit 702 is further configured to, in response to detecting (e.g., with detecting unit 704) the first input, maintain display of (e.g., with display enabling unit 718) one or more of the application icons from the first page of the multi-page user interface while enabling display of (e.g., with display enabling unit 708) the search interface.

In some embodiments, the multi-page application launch interface includes a fixed icon region that includes a plurality of application icons, and the fixed icon region is concurrently displayed with each page of the multiple pages of application icons; and enabling display of (e.g., with display enabling unit 708) the search interface in response to detecting the first input includes ceasing to display the fixed icon region.

In some embodiments, processing unit 702 is further configured to, while enabling display of the search input field: receive (e.g., with receiving unit 710) text input in the search input field; retrieve (e.g., with retrieving unit 712) search results that correspond to the text input; and enable display of (e.g., with display enabling unit 708) one or more of the retrieved search results on the display unit.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 6A-6D are, optionally, implemented by components depicted in FIGS. 1A-1B or FIG. 7. For example, displaying operations 602 and 614, detecting operation 604, and replacing operation 608 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 1100 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a touch-sensitive display, cause the device to perform operations including:
   displaying, on the touch-sensitive display, a first page of a multi-page application launch interface that includes multiple pages of application icons for launching distinct applications, wherein the first page includes a first plurality of application icons;
   while displaying the first page of the multi-page application launch interface on the touch-sensitive display, detecting, on the touch-sensitive display, a first input that includes detecting a first contact and detecting movement of the first contact on the touch-sensitive display; and
   in response to detecting the first input on the touch-sensitive display, determining a response from at least three possible responses to the first input based on evaluating the first input against a plurality of criteria, including:
      in accordance with a determination that the first input includes movement of the first contact in a first direction starting from a first region of the touch-sensitive display that is away from a first edge of the touch-sensitive display, replacing display of the first page of the multi-page application launch interface with display of a second page of the multi-page application launch interface that includes a second plurality of application icons that are different from the first plurality of application icons;
      in accordance with a determination that the first input includes movement of the first contact in a second direction that is perpendicular to the first direction starting from the first region of the touch-sensitive display that is away from the first edge of the touch-sensitive display, replacing display of at least a portion of the first page of the multi-page application launch interface with display of a search interface that includes a search input field for inputting search terms; and
      in accordance with a determination that the first input includes movement of the first contact starting from the first edge of the touch-sensitive display and moving away from the first edge, displaying a multitasking user interface that includes a plurality of concurrently displayed representations of open applications.

2. The non-transitory computer readable storage medium of claim 1, wherein the one or more programs further comprise instructions, which when executed by the electronic device, cause the device to perform:
   in response to detecting the first input:

in accordance with a determination that the first input includes movement of the first contact starting from a second edge of the touch-sensitive display and moving away from the second edge, displaying a notification interface that includes recently received notifications.

3. The non-transitory computer readable storage medium of claim 2, wherein the one or more programs further comprise instructions, which when executed by the electronic device, cause the device to perform:
in response to detecting the first input:
in accordance with a determination that the first input includes movement of the first contact starting from a third edge of the touch-sensitive display that is different from the first edge of the touch-sensitive display and the second edge of the touch-sensitive display, displaying a settings interface that includes controls for changing a plurality of device settings.

4. The non-transitory computer readable storage medium of claim 2, wherein the one or more programs further comprise instructions, which when executed by the electronic device, cause the device to perform:
while displaying a respective page of the multi-page application launch interface, detecting, on the touch-sensitive display, a second input that includes detecting a second contact and detecting movement of the second contact in the second direction; and
in response to detecting the second input on the touch-sensitive display:
in accordance with a determination that the second input starts from the first region of the touch-sensitive display that is away from the first edge of the touch-sensitive display, displaying the search interface; and
in accordance with a determination that the second input starts from the second edge of the touch-sensitive display, displaying the notification interface that includes recently received notifications.

5. The non-transitory computer readable storage medium of claim 1, wherein displaying the search interface includes displaying a keyboard for entering text into the search input field.

6. The non-transitory computer readable storage medium of claim 1, wherein displaying the search interface includes:
translating a set of application icons from the first page away from a respective edge of the display in the second direction; and
displaying the search input field in between the respective edge of the display and the application icons.

7. The non-transitory computer readable storage medium of claim 1, wherein displaying the search interface includes ceasing to display at least a subset of the application icons on the first page.

8. The non-transitory computer readable storage medium of claim 1, wherein the one or more programs further comprise instructions, which when executed by the electronic device, cause the device to perform:
in response to detecting the first input, maintaining display of one or more of the application icons from the first page of the multi-page application launch interface while displaying the search interface.

9. The non-transitory computer readable storage medium of claim 1, wherein:
the multi-page application launch interface includes a fixed icon region that includes a plurality of application icons, and the fixed icon region is concurrently displayed with each page of the multiple pages of application icons; and
displaying the search interface in response to detecting the first input includes ceasing to display the fixed icon region.

10. The non-transitory computer readable storage medium of claim 1, wherein the one or more programs further comprise instructions, which when executed by the electronic device, cause the device to perform:
while displaying the search input field:
receiving text input in the search input field;
retrieving search results that correspond to the text input; and
displaying one or more of the retrieved search results on the display.

11. A method comprising:
at an electronic device that includes a touch-sensitive display:
displaying, on the touch-sensitive display, a first page of a multi-page application launch interface that includes multiple pages of application icons for launching distinct applications, wherein the first page includes a first plurality of application icons;
while displaying the first page of the multi-page application launch interface on the touch-sensitive display, detecting, on the touch-sensitive display, a first input that includes detecting a first contact and detecting movement of the first contact on the touch-sensitive display; and
in response to detecting the first input on the touch-sensitive display, determining a response from at least three possible responses to the first input based on evaluating the first input against a plurality of criteria, including:
in accordance with a determination that the first input includes movement of the first contact in a first direction starting from a first region of the touch-sensitive display that is away from a first edge of the touch-sensitive display, replacing display of the first page of the multi-page application launch interface with display of a second page of the multi-page application launch interface that includes a second plurality of application icons that are different from the first plurality of application icons;
in accordance with a determination that the first input includes movement of the first contact in a second direction that is perpendicular to the first direction starting from the first region of the touch-sensitive display that is away from the first edge of the touch-sensitive display, replacing display of at least a portion of the first page of the multi-page application launch interface with display of a search interface that includes a search input field for inputting search terms; and
in accordance with a determination that the first input includes movement of the first contact starting from the first edge of the touch-sensitive display and moving away from the first edge, displaying a multitasking user interface that includes a plurality of concurrently displayed representations of open applications.

12. An electronic device, comprising:
a touch-sensitive display;
one or more processors;
memory; and one or more programs, wherein the one or more programs are stored in the memory and configured to be executed by the one or more processors, the one or more programs including instructions for:
  displaying, on the touch-sensitive display, a first page of a multi-page application launch interface that includes multiple pages of application icons for launching distinct applications, wherein the first page includes a first plurality of application icons;
  while displaying the first page of the multi-page application launch interface on the touch-sensitive display, detecting, on the touch-sensitive display, a first input that includes detecting a first contact and detecting movement of the first contact on the touch-sensitive display; and
  in response to detecting the first input on the touch-sensitive display, determining a response from at least three possible responses to the first input based on evaluating the first input against a plurality of criteria, including:
    in accordance with a determination that the first input includes movement of the first contact in a first direction starting from a first region of the touch-sensitive display that is away from a first edge of the touch-sensitive display, replacing display of the first page of the multi-page application launch interface with display of a second page of the multi-page application launch interface that includes a second plurality of application icons that are different from the first plurality of application icons;
    in accordance with a determination that the first input includes movement of the first contact in a second direction that is perpendicular to the first direction starting from the first region of the touch-sensitive display that is away from the first edge of the touch-sensitive display, replacing display of at least a portion of the first page of the multi-page application launch interface with display of a search interface that includes a search input field for inputting search terms; and
    in accordance with a determination that the first input includes movement of the first contact starting from the first edge of the touch-sensitive display and moving away from the first edge, displaying a multitasking user interface that includes a plurality of concurrently displayed representations of open applications.

13. The device of claim 12, wherein the one or more programs further include instructions for:
  in response to detecting the first input:
    in accordance with a determination that the first input includes movement of the first contact starting from a second edge of the touch-sensitive display and moving away from the second edge, displaying a notification interface that includes recently received notifications.

14. The device of claim 13, wherein the one or more programs further include instructions for:
  in response to detecting the first input:
    in accordance with a determination that the first input includes movement of the first contact starting from a third edge of the touch-sensitive display that is different from the first edge of the touch-sensitive display and the second edge of the touch-sensitive display, displaying a settings interface that includes controls for changing a plurality of device settings.

15. The device of claim 13, wherein the one or more programs further include instructions for:
  while displaying a respective page of the multi-page application launch interface, detecting, on the touch-sensitive display, a second input that includes detecting a second contact and detecting movement of the second contact in the second direction; and
  in response to detecting the second input on the touch-sensitive display:
    in accordance with a determination that the second input starts from the first region of the touch-sensitive display that is away from the first edge of the touch-sensitive display, displaying the search interface; and
    in accordance with a determination that the second input starts from the second edge of the touch-sensitive display, displaying the notification interface that includes recently received notifications.

16. The device of claim 12, wherein displaying the search interface includes displaying a keyboard for entering text into the search input field.

17. The device of claim 12, wherein displaying the search interface includes:
  translating a set of application icons from the first page away from a respective edge of the display in the second direction; and
  displaying the search input field in between the respective edge of the display and the application icons.

18. The device of claim 12, wherein displaying the search interface includes ceasing to display at least a subset of the application icons on the first page.

19. The device of claim 12, wherein the one or more programs include instructions for:
  in response to detecting the first input, maintaining display of one or more of the application icons from the first page of the multi-page user interface while displaying the search interface.

20. The device of claim 12, wherein
  the multi-page application launch interface includes a fixed icon region that includes a plurality of application icons, and the fixed icon region is concurrently displayed with each page of the multiple pages of application icons; and
  displaying the search interface in response to detecting the first input includes ceasing to display the fixed icon region.

21. The device of claim 12, wherein the one or more programs include instructions for:
  while displaying the search input field:
    receiving text input in the search input field;
    retrieving search results that correspond to the text input; and
    displaying one or more of the retrieved search results on the display.

22. The method of claim 11, including, in response to detecting the first input:
  in accordance with a determination that the first input includes movement of the first contact starting from a second edge of the touch-sensitive display and moving away from the second edge, displaying a notification interface that includes recently received notifications.

23. The method of claim 22, including, in response to detecting the first input:
  in accordance with a determination that the first input includes movement of the first contact starting from a third edge of the touch-sensitive display that is different from the first edge of the touch-sensitive display and the second edge of the touch-sensitive display, displaying a settings interface that includes controls for changing a plurality of device settings.

24. The method of claim 22, including:
while displaying a respective page of the multi-page application launch interface, detecting, on the touch-sensitive display, a second input that includes detecting a second contact and detecting movement of the second contact in the second direction; and
in response to detecting the second input on the touch-sensitive display:
in accordance with a determination that the second input starts from the first region of the touch-sensitive display that is away from the first edge of the touch-sensitive display, displaying the search interface; and
in accordance with a determination that the second input starts from the second edge of the touch-sensitive display, displaying the notification interface that includes recently received notifications.

25. The method of claim 11, wherein displaying the search interface includes displaying a keyboard for entering text into the search input field.

26. The method of claim 11, wherein displaying the search interface includes:
translating a set of application icons from the first page away from a respective edge of the display in the second direction; and
displaying the search input field in between the respective edge of the display and the application icons.

27. The method of claim 11, wherein displaying the search interface includes ceasing to display at least a subset of the application icons on the first page.

28. The method of claim 11, including:
in response to detecting the first input, maintaining display of one or more of the application icons from the first page of the multi-page application launch interface while displaying the search interface.

29. The method of claim 11, wherein:
the multi-page application launch interface includes a fixed icon region that includes a plurality of application icons, and the fixed icon region is concurrently displayed with each page of the multiple pages of application icons; and
displaying the search interface in response to detecting the first input includes ceasing to display the fixed icon region.

30. The method of claim 11, including, while displaying the search input field:
receiving text input in the search input field;
retrieving search results that correspond to the text input; and
displaying one or more of the retrieved search results on the display.

* * * * *